(12) United States Patent
Ramnarine et al.

(10) Patent No.: US 12,475,807 B1
(45) Date of Patent: Nov. 18, 2025

(54) ARTIFICIAL INTELLIGENCE-ASSISTED GENERATION OF LEARNING AND ASSESSMENT CONTENT

(71) Applicant: BrainPOP IP LLC, New York, NY (US)

(72) Inventors: Alexandrea Kavita Ramnarine, New York, NY (US); Ilia P. Rushkin, Worcester, MA (US); Yigal Rosen, Brookline, MA (US)

(73) Assignee: BRAINPOP IP LLC, New York, NY (US)

( * ) Notice: Subject to any disclaimer, the term of this patent is extended or adjusted under 35 U.S.C. 154(b) by 0 days.

(21) Appl. No.: 18/757,875

(22) Filed: Jun. 28, 2024

(51) Int. Cl.
*G09B 5/02* (2006.01)
*G09B 7/02* (2006.01)
*G09B 7/06* (2006.01)

(52) U.S. Cl.
CPC ............... *G09B 5/02* (2013.01); *G09B 7/02* (2013.01); *G09B 7/06* (2013.01)

(58) Field of Classification Search
CPC ............ G09B 5/02; G09B 7/02; G09B 7/06
See application file for complete search history.

(56) References Cited

U.S. PATENT DOCUMENTS

| 11,568,753 B2 | 1/2023 | Rushkin et al. | |
| 12,080,187 B1 * | 9/2024 | Ferrucci | G06F 40/30 |
| 2020/0374362 A1 * | 11/2020 | Walsh | H04L 67/60 |
| 2021/0049488 A1 * | 2/2021 | Smith | G09B 19/00 |
| 2022/0284528 A1 * | 9/2022 | Ahmad | G06Q 50/205 |
| 2022/0358376 A1 * | 11/2022 | De Silva | G06Q 10/10 |
| 2022/0383767 A1 * | 12/2022 | Manoria | G06N 20/00 |
| 2023/0385320 A1 * | 11/2023 | Cai | G06N 20/00 |
| 2024/0274025 A1 * | 8/2024 | Vleugels | G09B 7/00 |
| 2024/0412654 A1 * | 12/2024 | Olla | G09B 7/00 |

OTHER PUBLICATIONS

Kiyak, Yavuz Selim, "A ChatGPT Prompt for Writing Case-Based Multiple-Choice Questions," RevEspEduMed (Oct. 23, 2023). pp. 98-103.

Chan, et al., "Agree: A system for generating Automated Grammar Reading Exercises," arXiv:2210.16302v2 [cs.CL] (Nov. 2022). 9 pages.

Zu, et al., "Automated Distractor Generation for Fill-in-th-Blank Items Using a Prompt-Based Learning Approach," Psychological Test and Assessment Modeling, vol. 65,(1) (2003). pp. 55-75.

(Continued)

*Primary Examiner* — Jack Yip
(74) *Attorney, Agent, or Firm* — Finch & Maloney PLLC

(57) ABSTRACT

In an illustrative embodiment, systems and methods for artificial intelligence (AI)-assisted content generation are configured to combine customized content item parameter values with AI model prompt templates to generate AI model prompts designed for requesting generation of new content items. The content items may include reading items, assessment items, and/or vocabulary items for presenting to learners interacting with an online learning platform. The automatically generated content items may be presented at a user interface for approval by a requesting user.

19 Claims, 16 Drawing Sheets

(56) References Cited

OTHER PUBLICATIONS

Bezirhan, Ummugul and von Davier, Matthias, "Automated reading passage generation with OpenAI's large language model," Elsevier, Computers and Education: Artificial Intelligence 5 (2023) 100161. pp. 1-13.

Sayin, Ayfer, and Gierl, Mark J., "Automatic item generation for online measurement and evaluation: Turkish literature items," International Journal of Assessment Tools in Education, vol. 10, No. 2 (2023). p. 218-231.

Circi, et al., "Automatic item generation: foundations and machine learning-based approaches for assessments," Frontiers in Education-Mini Review, (May 10, 2023). pp. 1-5.

"Instructional Planning Without Boundaries," Eduaide.Ai: Instruction by Design: retrieved from the internet at: https://www.eduaide.al on Apr. 1, 2024. 9 pages.

"Magic School," Academic Content Generator: retrieved from the internet at: https://www.magicschool.ai/tools/academic-content-generator on Apr. 1, 2024. 3 pages.

Falcao, et al., "Progress is impossible without change: implementing automatic item generation in medical knowledge progress testing," Education and Information Technologies, vol. 29 (2024). pp. 4505-4530.

Attali, et al., "The interactive reading task: Transformer-based automatic item generation," Frontiers in Artificial Intelligence, (Jul. 22, 2022). pp. 1-13.

Gierl, et al., "Using Content Coding and Automatic Item Generation to Improve Test Security," Frontiers in Education, Original Research, vol. 07, article 853578 (May 4, 2022). pp. 1-14.

Sayin, et al., "Using OpenAI GPT to Generate Reading Comprehension Items," Educational Measurement Issues and Practice, Spring (2024), vol. 43. pp. 5-18.

International Search Report and Written Opinion received for PCT Application No. PCT/US2025/044747. Mail date: Sep. 17, 2025. 12 pages.

\* cited by examiner

🎯 Learning Objectives Generator

AI-generated standards-aligned objectives for a topic from the movie transcript of its corresponding educational video. A learning objective asserts what the student will or should do to demonstrate understanding of a concept.

Grade *406a*

[6 ⌄]

Topic *402a*

[ NATURAL SELECTI ]

Standards

For best results, enter at least one (1) CCSS ELA Literacy standard and content standards from CCSS, NGSS, C3, CASEL, ISTE, etc.

[ MS-LS4-4, 3-LS4-2, CC ] *408a*

[ Generate ] — *410*

Results *422*

☐ (MS-LS4-4, CCSS.ELA-LITERACY.RI.8.4) Students will be able to explain how natural selection leads to the evolution of new species.

☐ (3-LS4-2, CCSS.ELA-LITERACY.RI2.4) Students will be able to identify and describe the role of environmental pressures in natural selection.

☐ (MS-LS4-2, CCSS.ELA-LITERACY.RI.8.4) Students will be able to analyze evidence from the fossil record and other sources to support the theory of evolution through natural selection.

} *424*

[ Add to Item Bank ] — *426*

✷ Concepts Generator

AI-generated subject-specific concepts aligned to a topic, anchored to a learning objective.
A concept is not what the student will or should do, but rather is an idea, theme, process, or event that is testable.

[Item Bank] —*432a*

Selected Row ID

[38] —*434a*      [Save as New Row] —*442a*

Topic

[NATURAL SELECTI] —*402b*

Subject

[science] —*438a*

Objective

[Students will be able to] —*440a*

[Generate] —*444*

Results

The role of environmental pressures in natural selection  *446*

[Add to Item Bank] —*448*

 Item Generator

AI-generated question-answer sets for a variety of item types. Choose an item from the bank or fill in each field manually.

| Item Bank | — *432b*

Selected Row ID
| 38 |   | Save as New Row | — *442b*
— *434b*

Topic
| NATURAL SELECTI | — *402c*

Subject
| science | — *438b*

Grade
| 6 ⌄ | — *406b*

Standards
| 3-LS4-2, CCSS.ELA-Lr | — *408b*

Objective
| Students will be able to | — *440b*

Concept
| The role of environment | — *452*

DOK level
| 2 ⌄ | — *454*

Item Type — *456*
| ✓ Multiple Choice |
    Multiple Select
    Fill in the Blank ⎬ *458*
    Text Highlight
    Label Image

Topic
[NATURAL SELECTI] — 402c

Subject
[science] — 438b

Grade
[6 ⌄] — 406b

Standards
[3-LS4-2, CCSS.ELA-Lr] — 408b

Objective
[Students will be able to] — 440b

Concept
[The role of environment] — 452

DOK level
[2 ⌄] — 454

Item Type
[Multiple Select ⌄] — 456

[Generate] — 458

Results 460
___

"
"question": "Choose all that apply: 462
What role do environmental pressures play in natural selection?", 464
"correct_answer": 466
"Determine which variations are favorable",
"Limit the population of living things",
"Cause certain variations to help organisms survive"
,
"distractors": 468
"Increase the number of offspring produced",
"Help organisms adapt to new environments",
"Make organisms more similar to each other"

"
[Add to Item Bank] — 470

FIG. 4E

ARTIFICIAL INTELLIGENCE-ASSISTED GENERATION OF LEARNING AND ASSESSMENT CONTENT

BACKGROUND

Digital learning systems present learning materials, such as text, video, audio, and/or interactive content, focused on teaching a learner about topics of interest. Types of content items presented by digital learning systems include, in some examples, reading passage items, vocabulary lesson items, data presentation items (e.g., tables, graphs, diagrams, etc.), video lesson items, and/or audio lesson items. Further, the content items may include learning assessment items (e.g., quizzes, mini essays, etc.) for evaluating a learner's progress in developing proficiency in a topic through interaction with the various learning items. Each learning item may further be focused on a particular audience, such as, in some examples, a grade level, a learning standards framework, and/or an age range. Developing such content items involves a labor-intensive process to align learning standards with high quality multimodal content. Although an instructor or other content developer may leverage commercially available artificial intelligence (AI) models (e.g., chatbot agents) to assist in such content formation, the content developer will need to generate appropriate prompts to guide the AI model(s). Further, commonly available AI models lack both specialized training and appropriate scope limitation to consistently and reliably generate content, responsive to ad hoc prompts produced by content developers, that is appropriate to a target audience.

The inventors recognized a need to automate content generation at scale, thereby shifting resources away from time-consuming de novo content generation and creating efficiencies for refinement and publishing. Further, the inventors recognized the need for providing an automated content generation platform that provides a user-friendly and comprehensive interface for instructors across all experience levels to confidently use in producing new content items.

SUMMARY OF ILLUSTRATIVE EMBODIMENTS

In one aspect, the present disclosure relates to systems and methods for artificial intelligence (AI)-assisted content generation supporting the high quality, customized, and rapid creation of learning and assessment items by learning designers, assessment designers, and/or instructors. The learning and assessment items (referred to herein generally as "content items"), for example, may be integrated into materials presented via an online learning platform. Certain content items may include interactive controls for user manipulation of the content item and/or entry of data inputs. The inputs, in some examples, may include multiple choice selections, written responses, and/or short answer (e.g., one or more numbers and/or words) data entries. The content items, in some examples, may include text, images, animated graphics, video, and/or audio content. In some embodiments, a set of generative AI models are configured to function in tandem to control discrete steps in learning and assessment content generation. Each step, for example, may contribute to the creation of audience-aligned learning and assessment items, diagrams, and/or reading passages. The topic areas for the content items produced by the systems and methods may include, in some examples, literacy, science, math, social studies, and/or foreign language. The topic areas may be further refined, in some examples, by target audience (e.g., elementary school, middle school, high school, particular grade or grade range, particular age range, particular learning standard framework(s), etc.). After creation, the content items may be stored in "item bank" data repositories. The content items of the item bank, for example, may be accessed individually for publishing and teaching. In another example, the content items of the item bank may be accessed individually or grouped as a learning unit for downstream editing and/or further content generation.

In some embodiments, the content items produced through the AI-assisted content generation are organized for access and presentation via an online learning platform. The content items, in some examples, may be organized by subject area, topic(s), sub-topic(s), language, grade level, learning standard, age or age range, type (e.g., learning item, assessment item, multiple choice quiz item, short essay assessment item, vocabulary item, video item, etc.), instructor(s), learning organization (e.g., school, school district, etc.), and/or geographic region (e.g., school district, city, municipality, state, province, country, etc.).

In one aspect, the present disclosure relates to systems of interconnected but free-standing task-tuned AI models configured to generate online learning resource materials directed to particular subject areas, topics, and/or audiences. Each AI model, for example, may be tuned to produce a particular content item type. Based on the type of content item desired, a user, for example, may be provided with a graphical user interface (GUI) for entering or selecting discrete inputs to a content item type-specific prompt template. The discrete inputs, for example, may be configured as customized selections for injecting into the pre-existing AI model prompt template configured to serve as input to one or more large language models (LLMs).

In some embodiments, each prompt produced through combining an AI model prompt template with the user-entered discrete inputs is provided to a corresponding one of the task-tuned AI models for processing. Each response from the task-tuned AI model, in turn, may be formatted as a draft content item or section thereof for review by the user. The user, for example, may be provided the opportunity, via the GUI, to refine one or more discrete inputs, thereby further modifying the content item or section thereof prior to acceptance. Upon user acceptance, the content item or section thereof generated by the task-tuned AI model may be saved to a content item bank. If only a section of a content item has been generated, the user may further interact with the GUI to generate further sections until a complete content item has been produced.

In some embodiments, at least a portion of the inputs provided by the user are saved contemporaneously with the storage of the content item or section thereof. In this manner, user preferences may be derived through both the inputs contributing to the accepted work as well as the inputs later overwritten in generating the accepted work, further supporting swift automation of content generation customized to the preferences of a particular user. In one aspect, the present disclosure relates to systems and methods for collaboratively producing lesson content among instructors and/or designers. Content item parameters used to generate content items by one content developer, for example, may be provided for review and/or adjustment (e.g., on a read-only or read-write basis) within a shared content item repository. In one example, multiple content developers may build a corpus of content items (e.g., a lesson unit, a class syllabus of materials, etc.) having a consistent style and/or format by borrowing content item parameters from already existing content items for the development project. In another example, content items developed by one content developer and/or developed targeting one group of students (e.g., a particular grade level, age, performance level, etc.) may be adjusted by a different instructor and/or designer. In this manner, the second content developer may adjust, in some examples, for personal style/ preferences and/or for a different audience (e.g., adjusting difficulty level up or down, adjusting grade level up or down, adjusting learning framework parameters, adjusting target language parameters, etc.).

In one aspect, the present disclosure relates to a platform and interactive user interface for guiding a user (e.g., content developer, instructor, educator, etc.) in developing content items for a given subject and/or topic. The user, for example may be provided, in a graphical user interface, the option to select one or more of a subject, a topic, a grade-level, an age or age range, and/or one or more learning standard frameworks to guide creation of learning objectives. The learning objectives, for example, may be related to a particular teaching material or materials (e.g., book, article, video, lesson plan, teaching unit, etc.). The user may provide the teaching material(s) and/or the learning objectives GUI may be linked to an online resource containing the teaching material(s). In illustration, a web page including learning content and/or links thereto may include a control selectable for generating learning objectives related to the learning content. Responsive to the submitted guidance (e.g., selected options and/or submitted learning material), one or more generative AI models may be automatically prompted to produce learning objective options. The prompt, for example, may be in the form of a standard template filled in with the options and/or learning content provided by the user.

In some embodiments, the GUI presents, based on a response from the AI model(s), a set of learning objective options for consideration by the user. The learning objectives, for example, may be presented as brief synopses (e.g., one to three sentences) detailing the goal for demonstration of student knowledge related to the learning content. The user, in response, may select one or more of the learning objectives for use in generating content items. The learning objectives, for example, may be added to a user's learning objectives storage region (e.g., an item bank).

In some embodiments, the GUI presents, in relation to selection of one or more learning objectives (e.g., from the prior GUI or from stored learning objectives) and a topic, an item generator user interface for generating a new content item. The item generator user interface, for example, may include selection of a type of content item (e.g., multiple choice, fill-in-the-blank, vocabulary, etc.).

Based on the user's selections and/or user preferences or settings associated with the user, a grounding knowledge collection corresponding to the appropriate subject and/or topic (potentially further filtered by additional identifiers such as the grade level, age (range), and/or learning standard framework(s)) may be accessed for use by one or more AI models in generating a content item. The grounding knowledge, for example, may include curated ground truth learning materials (e.g., textbook content, encyclopedic content, articles, scholarly papers, digital publications, dictionary content, thesaurus content, etc.) covering a set of subjects and/or topics. The grounding knowledge may be collected and stored to provide the generative AI with a set of trusted materials for formulating content items. Using the accessed grounding knowledge and further guided inputs from the user (e.g., selection of control types, number of questions for presentation to a learner, style of content presentation, etc.) gathered through an interactive content development process presented to the user, one or more content generation-tasked AI models may craft a draft content item for review by the user.

In some embodiments, the user may review the draft content item and refine one or more aspects of the draft content item (e.g., text portion(s), image portion(s), layout/ style aspect(s), video portion(s), etc.) through a guided process involving one or more editing-tasked AI models. The editing-tasked AI model(s), in another example, may be used to generate supporting content such as, in some examples, figures, diagrams, and/or data tables.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 4A through FIG. 4E illustrate example graphical user interfaces for guiding a user through content item generation;

DETAILED DESCRIPTION OF ILLUSTRATIVE EMBODIMENTS

Figure 1A:
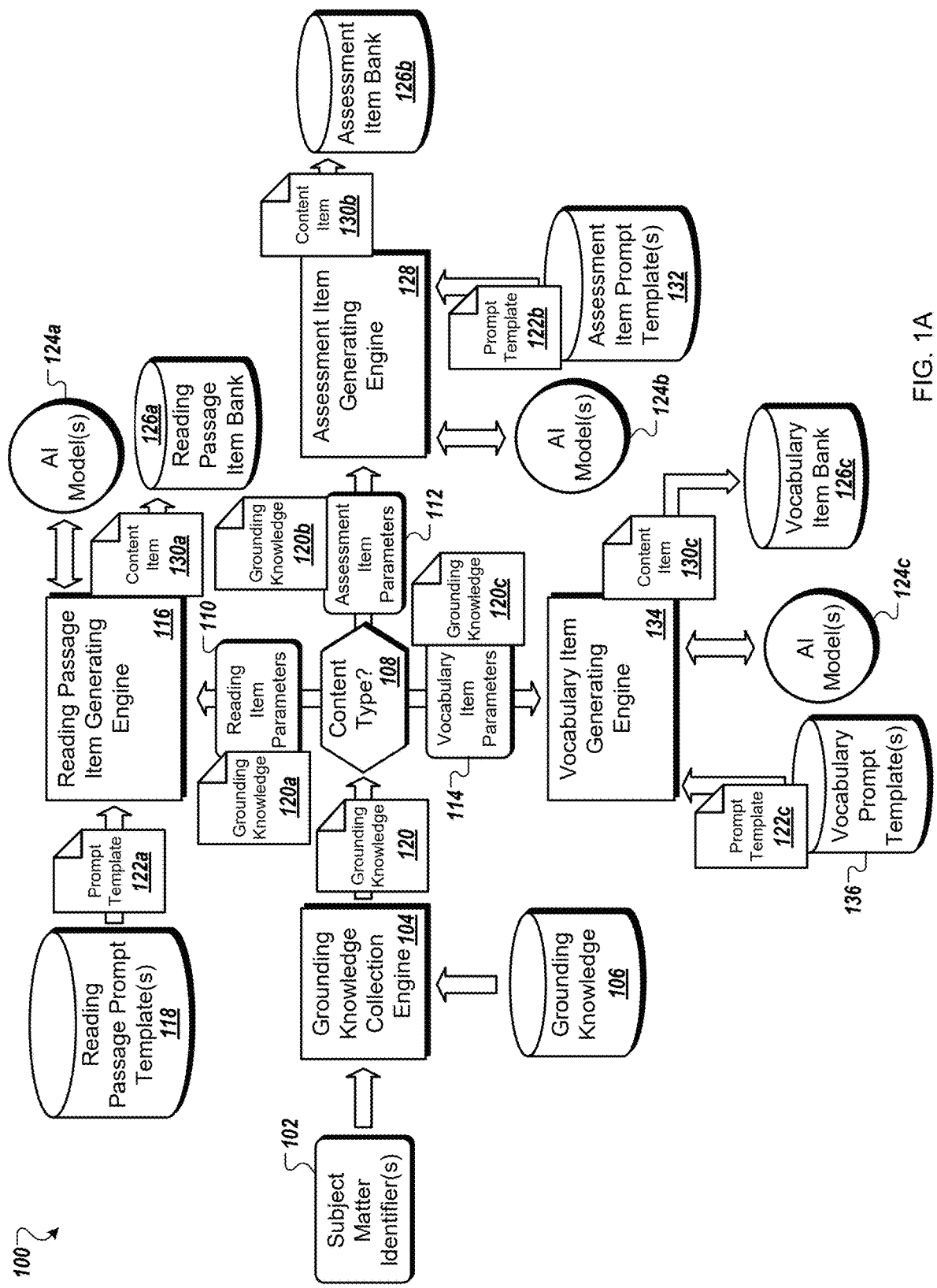
FIG. 1A illustrates a flow diagram of an example process for creating content items with the assistance of artificial intelligence models.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration.

Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 illustrates a flow diagram of an example process 100 for creating content items 130 with the assistance of artificial intelligence models 124. The content items 130, as illustrated, may include reading items 130a, assessment items 130b, and/or vocabulary items 130c, although, in other embodiments, the types of content items 130 may differ. Further, within each type of content item 130a-c, two or more content item variants may exist, such as, in an illustrative example of assessment items 130b, multiple choice assessment items, fill-in-the-blank assessment items, and/or short essay assessment items. The process 100, for example, may be executed in response to selections made by a user during a guided content item generation process presented via a graphical user interface.

In some implementations, the process 100 begins with a grounding knowledge collection engine 104 obtaining one or more subject matter identifiers 102. The subject matter identifier(s) 102, for example, may include an indication of preexisting online learning material, such as audio lesson content, video lesson content, and/or text lesson content (e.g., reading materials). The subject matter identifier(s) 102 may include, in an illustrative example, identification of a particular lesson content item derived through selecting the lesson content item within a GUI (e.g., a drop-down menu listing the lesson content items by name and/or brief description, a control within a GUI presenting the lesson content item or a visual representation thereof such as a graphical thumbnail, first screen content, etc.).

The grounding knowledge collection engine 104 may access stored grounding knowledge 120 from a grounding knowledge repository 106 related to the subject matter identifier(s) 102. The grounding knowledge repository 106, in relation to video lesson content and/or audio lesson content, for example, may include a transcript of the identified lesson content as grounding knowledge 120a. Further, in relation to text lesson content, the grounding knowledge repository 106 may include a copy of the text as grounding knowledge 120a. The grounding knowledge 120, further to the example, may include metadata related to the lesson content, such as, in some examples, a target grade or grade range, a target reading framework level (e.g., Lexile, Flesch-Kincaid, Flesch Reading Ease, etc.), a target readability index level (e.g., Dale-Chall readability level, automated readability index (ARI) level, Gunning Fog level, Coleman-Liau level, etc.), and/or a target topic or topics (e.g., math, science, history, etc.).

In other embodiments (not illustrated), rather than or in addition to providing one or more subject matter identifiers 102, the grounding knowledge collection engine 104 may receive new grounding knowledge (e.g., a reading text, lecture notes, etc.) related to the lesson content. In this example, the grounding knowledge collection engine 104 may store the new grounding knowledge to the grounding knowledge repository 106.

In some implementations, a content item type 108 is determined in relation to the subject matter identifier(s) 102. The content item type 108, in some examples, may be determined through a manual selection by an end user (e.g., a control in a user interface) or through a contextual selection (e.g., a particular screen a user began on, user account preferences, etc.). As illustrated, the three example content types include the reading item type, the assessment item type, and the vocabulary item type. Based on the content item type, particular content item parameters may be customized to produce AI model prompts for generating new content items.

In the event of the reading item type, in some implementations, the grounding knowledge 120a obtained by the grounding knowledge collection engine 104 from the grounding knowledge repository 106 as well as reading item parameters 110 (e.g., user selections and/or metadata associated with the content generation request), are provided to a reading passage item generating engine 116. The reading item parameters 110, in some examples, may include one or more of a subject area (e.g., literacy, science, math, social studies, foreign language, etc.), a target audience (e.g., elementary school, middle school, high school, particular grade or grade range, particular age or age range), and/or one or more learning standard frameworks (e.g., a Next Generations Science Standards (NGSS) framework, a Common Core State Standards (CCSS) framework, an English Language Arts (ELA) literacy standard, a College, Career, and Civic Life (C3) standard, a Social and Emotional Learning (SEL) standard such as a Collaborative for Academic, Social, and Emotional Learning (CASEL) standard, an International Society for Technology in Education (ISTE) standard, a national learning standards framework, a teaching organization standards framework, etc.). A portion of the reading item parameters 110 may be drawn from the subject matter identifier(s) 102.

The reading passage item generating engine 116, in some implementations, accesses a reading passage prompt template 122a from a reading passage prompt template data store 118. The reading passage prompt template data store 118, for example, may include multiple prompt templates, each prompt template appropriate to a particular type of grounding knowledge 120a, an assessment profile or strategy (e.g., multiple choice, fill-in-the-blank, matching, short answer, and/or other assessment item architecture), and/or certain styles (e.g., menu selections, multiple choice option pattern, term and/or phrase input(s), etc.) of reading item parameters 110. The styles of reading item parameters 110, for example, may be based on a user interface presented to the requester in generating the reading item parameters 110 and/or subject matter identifiers 102. This may, in turn, depend upon the sophistication of the end user (e.g., a professional content designer versus an educator interfacing with the system as a customer). The reading passage prompt template 122a, for example, may be an artificial intelligence (AI) model prompt architecture (e.g., fill-in-the-blank style form, scripting language algorithm, etc.) designed to produce wording, when combined with reading item parameters 110 and fed the grounding knowledge 120a, that is prompt engineered for obtaining consistent, reliable results from a corresponding AI model 124a tuned for receiving unique inputs from users arranged within the constructs of the prompt template 122a.

In some implementations, the reading passage item generating engine 116 combines the reading item parameters 110 with the prompt template 122a and the grounding knowledge 120a to produce input for a given AI model of one or more AI models 124a. The reading passage item generating engine 116, for example, may produce one or more model prompts designed to communicate a request to at least one AI model of the one or more AI models 124a based on the reading item parameters 110 and grounding knowledge 120a. The reading passage item generating engine 116 may supply the one or more model prompts to one or more of the AI model(s) 124a.

Responsive to the reading passage item generating engine 116 providing the one or more model prompts to the one or more AI model(s) 124a, in some implementations, each of the AI model(s) 124a prompted by the reading passage item generating engine 116 returns an AI-generated content item 130a or portion thereof. The content item 130a, for example, may include text, graphic, and/or video content designed to provide a learner with a static or interactive reading passage exercise corresponding to the reading item parameters 110 and based on the grounding knowledge 120a.

In some implementations, the reading passage item generating engine 116 stores the content item 130a to a reading passage item bank 126a. The reading passage item generating engine 116 may store the content item 130a along with metadata identifying the reading item parameters 110, the grounding knowledge 120, the particular prompt template 122a, and/or the particular AI model(s) 124a used to produce the content item 130a. Further, the metadata may include a date and/or timestamp, a unique identifier associated with the content item 130a, identification of an end user who provided the request for content item generation, and/or identification of a design team and/or educational organization associated with generation of the content item 130a (e.g., a group ownership). In some examples, the metadata may include a topic, a subject, one or more learning standards, an original reading passage used to produce the content item 130a, a grade or grade range, a reading framework level, and/or a readability index level. In some embodiments, the prompt template 122a instructs the AI model(s) 124a to adjust a present complexity or difficulty of the text for a different target audience. In this circumstance, the metadata may include both original metadata associated with the original reading passage (e.g., grade level, learning standard(s), reading framework level, readability index level, etc.) as well as content item metadata associated with the adjusted reading passage (e.g., updated grade level, updated learning standard(s), updated reading framework level, updated readability index level, etc.).

The content item 130a, in some implementations, is presented to an end user for review and approval. Further, in some embodiments, the end user may have the option to edit the content item 130a. The user, for example, may submit feedback that is used, by the reading passage item generating engine 116 to adjust the reading item parameters 110 and/or include additional grounding knowledge 120a to update the prompting of the AI model(s) 124a. The reading passage item bank 126a, in some implementations, tracks metadata related to iterations of adjustments to the content item 130a. For example, the adjustment tracking metadata may be used at a later time to inform the system of user preferences (e.g., to auto-generate a portion of the reading item parameters, recommend default values of a portion of the reading item parameters to the end user, etc.).

Returning to determining the content item type 108, in the event of the assessment item type, in some implementations, the grounding knowledge 120b obtained by the grounding knowledge collection engine 104 from the grounding knowledge repository 106 as well as assessment item parameters 112 (e.g., user selections and/or metadata associated with the content generation request), are provided to an assessment item generating engine 128. The assessment item parameters 112, in some examples, may include one or more of a subject area, a target audience, one or more learning standard frameworks, one or more learning objectives, and/or one or more target learning concepts (e.g., a testable idea, theme, process, or event, etc.). A portion of the assessment item parameters 112 may be drawn from the subject matter identifier(s) 102.

In some implementations, when the content type 108 is an assessment item, a first step in generating the assessment item is applying automated assistance in identifying one or more learning objectives. Turning to FIG. 1B, a flow diagram of an example process 140 illustrates an expanded path to generating an assessment item using the assessment item generating engine 128 of FIG. 1A.

In some implementations, the process 140 begins with providing a learning objectives generating engine 142 with the grounding knowledge 120b and one or more learning objective parameters 112a. The learning objective parameters 112a, for example, may be a subset of the assessment item parameters 112, such as a target audience and/or one or more learning standards. The learning objectives generating engine 142, for example, may apply the learning objective parameters 112a to identify learning objective options both relevant to the grounding knowledge 120b and appropriate to the audience and/or learning standards identified in the assessment item parameters 112.

The learning objectives generating engine 142, in some implementations, accesses, from a learning objectives prompt template(s) repository 144, a prompt template 144a. The learning objectives prompt template repository 144, for example, may include multiple learning objectives prompt templates, each prompt template appropriate to a particular type of grounding knowledge 120b, an assessment profile or strategy (e.g., multiple choice, fill-in-the-blank, matching, short answer, and/or other assessment item architecture), and/or certain styles (e.g., menu selections, multiple choice option pattern, term and/or phrase input(s), etc.) of learning objective parameters 112a. The styles of learning objective parameters 112a, for example, may be based on a user interface presented to the requester in generating the learning objective parameters 112a. The learning objective prompt template 144a, for example, may be an artificial intelligence (AI) model prompt architecture (e.g., fill-in-the-blank style form, scripting language algorithm, etc.) designed to produce wording, when combined with learning objective parameters 112a and fed the grounding knowledge 120b, that is prompt engineered for obtaining consistent, reliable results from a corresponding AI model 146 tuned for receiving unique inputs from users arranged within the constructs of the learning objective prompt template 144a.

In some implementations, the learning objectives generating engine 142 combines the learning objective parameters 112a with the prompt template 144a and the grounding knowledge 120b to produce input for a given AI model of one or more AI models 146. The learning objectives generating engine 142, for example, may produce one or more model prompts designed to communicate a request to at least one AI model of the one or more AI models 146 based on the learning objective parameters 112a and grounding knowledge 120b. The learning objectives generating engine 142 may supply the one or more model prompts to one or more of the AI models 146.

Responsive to the learning objectives generating engine 142 providing the one or more model prompts to the one or more AI model(s) 146, in some implementations, each of the AI model(s) 146 prompted by the learning objectives generating engine 142 returns one or more AI-generated learning objectives 148. The learning objectives 148, for example, may include brief synopses (e.g., one to three sentences) detailing the goal for demonstration of student knowledge related to the grounding knowledge 120b. The learning objectives 148 may include one or more separate learning objectives (e.g., generated by the same or a different one of the AI models 146). The separate learning objectives, in illustration, may include a learning objective directed to each subject matter identified in the grounding knowledge 120b (e.g., a learning objective advancing history knowledge plus a learning objective advancing science knowledge). Further, the learning objectives generating engine 142 may fill in multiple prompt templates 144a responsive the grounding knowledge 120b and/or learning objective parameters 112a to obtain a coordinating set of learning objectives 148.

In some embodiments, a user is provided the opportunity to select one or more of the learning objectives 148 out of a set (e.g., three, five, etc.) of AI-generated learning objectives for use in generating content items. The learning objectives generating engine 142 may store the learning objectives 148 to the assessment item bank 126b.

Figure 1B:
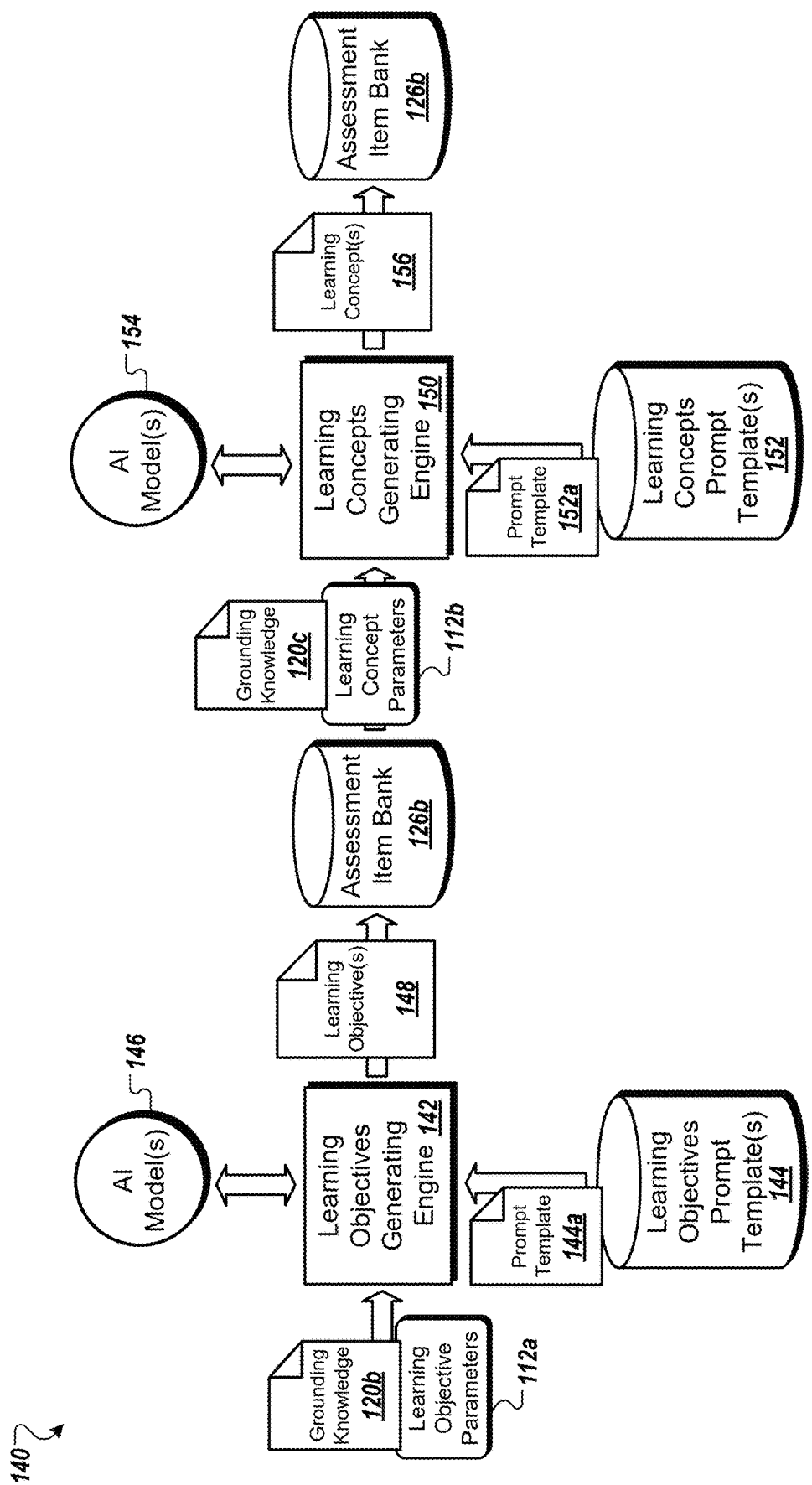
FIG. 1B illustrates a flow diagram of an example process for artificial intelligence-assisted identification to inputs for creating assessment-type content items.
Figure 2:
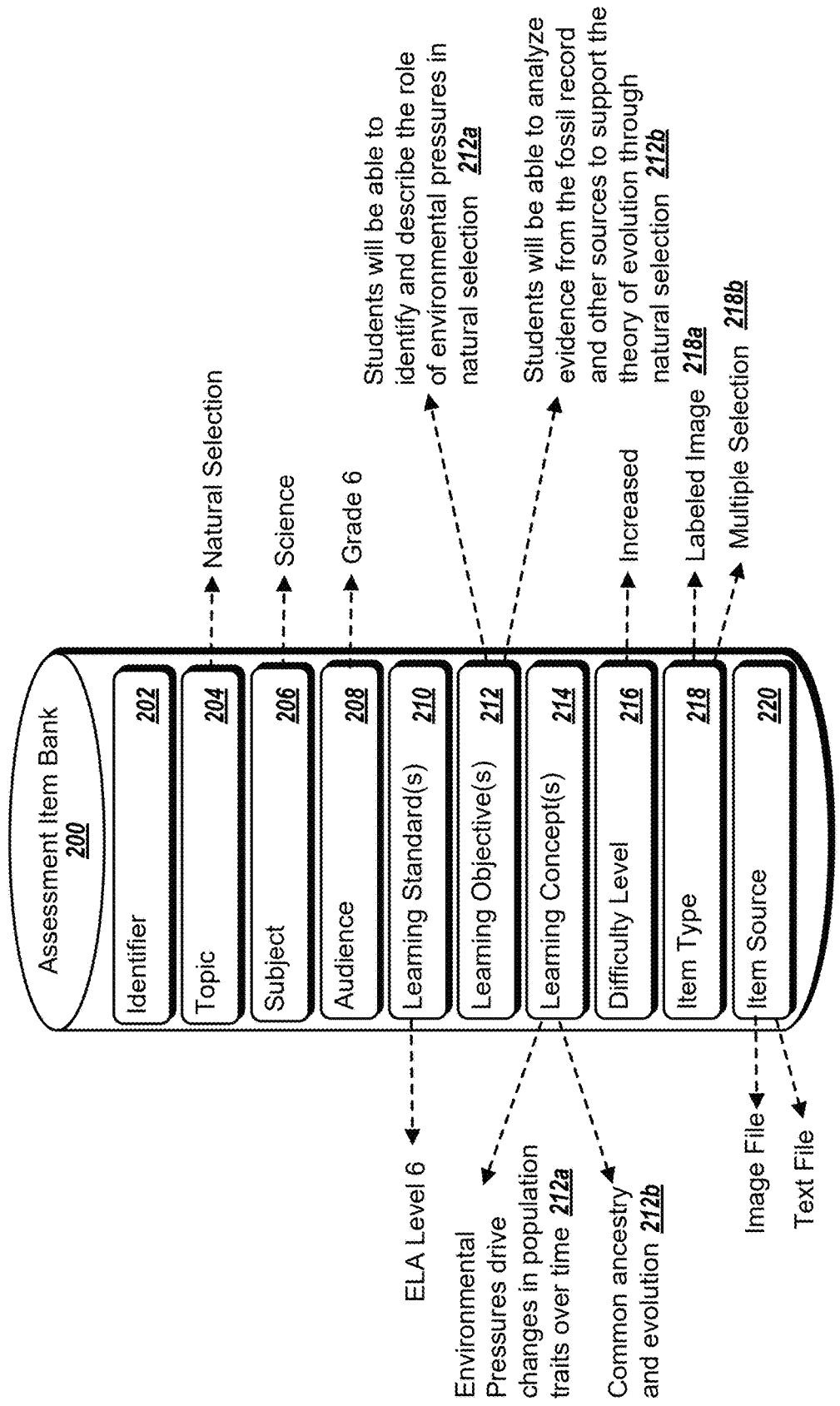
FIG. 2 is a block diagram of example types of data involved in creating and storing an assessment-type content item.

Turning to FIG. 2, for example, an example assessment item bank 200 includes a set of learning objectives 212 generated based on learning objective parameters (e.g., the learning objective parameters 112a of FIG. 1B) including a topic 204 of natural selection within a subject 206 of science, with a target audience 208 of grade 6 at a learning standard 210 of ELA level 6. The learning objectives 212 include a first objective 212a ("students will be able to identify and describe the role of environmental pressures in natural selection") and a second objective 212b ("students will be able to analyze evidence from the fossil record and other sources to support the theory of evolution through natural selection"). Each learning objectives option 212a, 212b, in some embodiments, corresponds to a different assessment item identifier 202 (e.g., two separate rows of a database sharing the same values for the topic 204, the subject 206, the audience 208, and the learning standards 210).

Returning to FIG. 1B, in some implementations, a learning concepts generating engine 150 obtains learning concept parameters 158 for forming one or more learning concepts 156 related to at least one of the learning objective(s) 148. The learning concept parameters 158, for example, may be captured as at least a portion of the learning objective parameters 112a as well as at least one of the learning objectives 148 as stored to the assessment item bank 126b. In other embodiments, a user may enter at least a portion of the learning concept parameters 158. The user, for example, may create the learning concept parameters 158 without first having automatically generated learning objectives 148 created with the learning objectives generating engine 142. The learning concept parameters 158, in some examples, may include a topic, a subject, and/or an objective. Further, the learning objectives generating engine may use the grounding knowledge 120b.

In some implementations, the learning concepts generating engine 150 accesses, from a learning concepts prompt template(s) repository 152, a prompt template 152a. The learning concepts prompt template data repository 152, for example, may include multiple learning concepts prompt templates, each prompt template appropriate to a particular type of grounding knowledge 120b and/or certain styles (e.g., menu selections, multiple choice option pattern, term and/or phrase input(s), etc.) of learning concept parameters 158 (e.g., at least a portion of the learning assessment parameters 112b of FIG. 1A which may be user inputted versus assessment item bank-accessed). The learning concepts prompt template 152a, for example, may be an artificial intelligence (AI) model prompt architecture (e.g., fill-in-the-blank style form, scripting language algorithm, etc.) designed to produce wording, when combined with learning concept parameters 158, that is prompt engineered for obtaining consistent, reliable results from a corresponding AI model 154 tuned for receiving unique inputs from users and/or the assessment item bank 126b stored parameters, arranged within the constructs of the learning concept prompt template 152a.

In some implementations, the learning concepts generating engine 150 combines the learning concept parameters 158 with the prompt template 152a and at least a portion of the grounding knowledge 120b to produce input for a given AI model of one or more AI models 154. The learning concepts generating engine 150, for example, may produce one or more model prompts designed to communicate a request to at least one AI model of the one or more AI models 154 based on the learning concept parameters 158 (and, in some embodiments, the grounding knowledge 120b). The learning concepts generating engine 150 may supply the one or more model prompts to one or more of the AI model(s) 154.

Responsive to the learning concepts generating engine 150 providing the one or more model prompts to the one or more AI model(s) 154, in some implementations, each of the AI model(s) 154 prompted by the learning concepts generating engine 150 returns one or more AI-generated learning concepts 156. The learning concepts 156, for example, may each identify a testable idea, theme, process, or event, for example in a phrase or sentence. The learning concepts 156 may include one or more separate learning concepts (e.g., generated by the same or a different one of the AI models 154). The separate learning concepts, in illustration, may include a learning concept directed to each of a set of testable ideas, themes, processes, or events included in the grounding knowledge 120c. Further, the learning concepts generating engine 150 may fill in multiple prompt templates 152a responsive the grounding knowledge 120c and/or learning concept parameters 158 to obtain a coordinating set of learning concepts 156. In some embodiments, a user is provided the opportunity to select one or more of the learning concepts 156 out of a set (e.g., three, five, etc.) of AI-generated learning concepts for use in generating content items.

The learning concepts generating engine 156, in some implementations, stores the learning concepts 156 to the assessment item bank 126b. Turning to FIG. 2, in illustration, the example assessment item bank 200 includes a set of learning concepts 214, including a first learning concept 214a ("environmental pressures drive changes in population traits over time") corresponding to the first learning objective 212a, and a second learning concept 214b ("common ancestry and evolution") corresponding to the second learning objective 212b.

Returning to FIG. 1A, the assessment item generating engine 128, in some implementations, accesses at least a portion of the assessment item parameters 112 from the assessment item bank 126b as generated through user interactions with the learning objectives generating engine 142 and/or the learning concepts generating engine 150, as described in relation to FIG. 1B. Further, at least a portion of the assessment item parameters 112 may be obtained, during assessment item generation, through user input via a graphical user interface. For example, a user may add, to the learning concept parameters 158 and the learning concept(s) 156, a difficulty level (e.g., depth of knowledge level) to identify a relative familiarity of the target audience with the grounding knowledge 120b. The difficulty level, for example, is illustrated in FIG. 2 as a difficulty level 216. The difficulty level, in some examples, may be numeric (e.g., a scale from 1-3, 1-5, 1-10) or text-based (e.g., a set of beginning, competent, and advanced, and expert, a set of decreased, standard, or increased, etc.). A user may be provided the opportunity to select the difficulty level within a graphical user interface.

In some implementations, the assessment item generating engine 128 accesses an assessment item prompt template 122b from an assessment item prompt template data store 130. The assessment item prompt template data store 128, for example, may include multiple prompt templates, each prompt template appropriate to a particular type of grounding knowledge 120b and/or certain styles (e.g., menu selections, multiple choice option pattern, term and/or phrase input(s), etc.) of assessment item parameters 112. The styles of assessment item parameters 112, for example, may be based on a user interface presented to the requester in generating the assessment item parameters 112 and/or subject matter identifiers 102. The assessment item prompt template 122b, for example, may be an artificial intelligence (AI) model prompt architecture (e.g., fill-in-the-blank style form, scripting language algorithm, etc.) designed to produce wording, when combined with assessment item parameters 112 and fed the grounding knowledge 120b, that is prompt engineered for obtaining consistent, reliable results from a corresponding AI model 124b tuned for receiving unique inputs from users arranged within the constructs of the prompt template 122b.

In some implementations, the assessment item generating engine 128 combines the assessment item parameters 112 with the prompt template 122b and the grounding knowledge 120b to produce input for a given AI model of one or more AI models 124b. The assessment item generating engine 128, for example, may produce one or more model prompts designed to communicate a request to at least one AI model of the one or more AI models 124b based on the assessment item parameters 112 and grounding knowledge 120b. The assessment item generating engine 128 may supply the one or more model prompts to one or more of the AI model(s) 124b.

Responsive to the assessment item generating engine 128 providing the one or more model prompts to the one or more AI model(s) 124b, in some implementations, each of the AI model(s) 124b prompted by the assessment item generating engine 128 returns an AI-generated content item 130b or portion thereof. The content item 130b, for example, may include text, graphic, and/or video content designed for use in providing a learner with an interactive learning assessment (e.g., a multiple-choice quiz, a fill-in-the-blank quiz, a matching game, etc.) corresponding to the assessment item parameters 112 and based on the grounding knowledge 120b. Aspects of the content item 130b, in some examples, may include stimulus passages for filling in the blank, a set of correct answers, sets of wrong answers for presenting in relation to each assessment prompt in a multiple-choice style assessment item, and/or identification of matching items in a matching quiz. Each portion of the content item 130b, for example, may be considered to be a different content item (e.g., generated by the same or a different one of the AI models 124b). The portions, in illustration, may include each question of a set of questions. Further, the assessment item generating engine 128 may fill in multiple prompt templates 122b responsive to a single set of assessment item parameters 112 to obtain a coordinating set of content items 130b.

Turning to FIG. 2, for example, a content item type 218 includes, in relation to the first learning objective 212a and the first learning concept 214, a first item type 218a of "labeled image" and, in relation to the second learning objective 212b and the second learning concept 214b, a second item type 218b of "multiple selection."

Returning to FIG. 1A, in some implementations, the assessment item generating engine 128 stores the content item 130b to an assessment item bank 126b. The content item 130b, for example, may include both a set of assessment prompts (e.g., questions) as well as a set of correct answers. Further, in some embodiments, the content item 130b includes a set of distractors (e.g., wrong answers for multiple choice options).

In some implementations, the assessment item generating engine 128 stores the content item 130b along with metadata identifying the assessment item parameters 112, the grounding knowledge 120b, the particular prompt template 122b, and/or the particular AI model(s) 124b used to produce the content item 130b. Additionally, the metadata may include a date and/or timestamp, a unique identifier associated with the content item 130b, identification of an end user who provided the request for content item generation, and/or identification of a design team and/or educational organization associated with generation of the content item 130b (e.g., a group ownership). In some examples, the metadata may include a topic, a subject, one or more learning standards, the grounding knowledge 120b used to produce the content item 130*b*, a grade or grade range, a learning framework level, and/or a learning capability index level. As discussed above, in some embodiments, the prompt template 122*b* instructs the AI model(s) 124*b* to adjust a present complexity or difficulty based on the familiarity and/or level of sophistication the target audience has with the grounding knowledge 120*b*. In this circumstance, the metadata may include the level of difficulty.

The content item 130*b*, in some implementations, is presented to an end user for review and approval. Further, in some embodiments, the end user may have the option to edit the content item 130*b*. The user, for example, may submit feedback that is used by the assessment item generating engine 128 to adjust the assessment item parameters 112 and/or include additional grounding knowledge 120*b* to update the prompting of the AI model(s) 124*b*. The assessment item bank 126*b*, in some implementations, tracks metadata related to iterations of adjustments to the content item 130*b*. For example, the adjustment tracking metadata may be used at a later time to inform the system of user preferences (e.g., to auto-generate a portion of the assessment item parameters, recommend default values of a portion of the assessment item parameters to the end user, etc.).

Returning to the content type selection (108), in the event of the vocabulary item type, in some implementations, the grounding knowledge 120*c* obtained by the grounding knowledge collection engine 104 from the grounding knowledge repository 106 as well as vocabulary item parameters 114 (e.g., user selections and/or metadata associated with the content generation request), are provided to a vocabulary item generating engine 134. The vocabulary item parameters 114, in some examples, may include one or more of a subject area, a target audience, and/or one or more learning standard frameworks. A portion of the vocabulary item parameters 114 may be drawn from the subject matter identifier(s) 102.

The vocabulary item generating engine 134, in some implementations, accesses a vocabulary item prompt template 122*c* from a vocabulary prompt template data store 136. The vocabulary prompt template data store 136, for example, may include multiple prompt templates, each prompt template appropriate to a particular type of grounding knowledge 120*c* and/or certain styles (e.g., menu selections, multiple choice option pattern, term and/or phrase input(s), etc.) of vocabulary item parameters 114. The vocabulary prompt template 122*c*, for example, may be an artificial intelligence (AI) model prompt architecture (e.g., fill-in-the-blank style form, scripting language algorithm, etc.) designed to produce wording, when combined with the vocabulary item parameters 114 and fed the grounding knowledge 120*c*, that is prompt engineered for obtaining consistent, reliable results from a corresponding AI model 124*c* tuned for receiving unique inputs from users arranged within the constructs of the prompt template 122*c*.

In some implementations, the vocabulary item generating engine 134 combines the vocabulary item parameters 114 with the prompt template 122*c* and the grounding knowledge 120*c* to produce input for a given AI model of one or more AI models 124*c*. The vocabulary item generating engine 134, for example, may produce one or more model prompts designed to communicate a request to at least one AI model of the one or more AI models 124*c* based on the vocabulary item parameters 114 and grounding knowledge 120*c*. The vocabulary item generating engine 134 may supply the one or more model prompts to one or more of the AI model(s) 124*c*.

Responsive to the vocabulary item generating engine 134 providing the one or more model prompts to the one or more AI model(s) 124*c*, in some implementations, each of the AI model(s) 124*c* prompted by the vocabulary item generating engine 134 returns an AI-generated content item 130*c* or portion thereof. The content item 130*c*, for example, may include text, graphic, and/or video content designed to provide a learner with a static or interactive vocabulary exercise corresponding to the vocabulary item parameters 114 and based on the grounding knowledge 120*c*. Each portion of the content item 130*c*, for example, may be considered to be a different content item (e.g., generated by the same or a different one of the AI models 124*c*). The portions, in illustration, may include each vocabulary term of a set of vocabulary terms. Further, the vocabulary item generating engine 134 may fill in multiple prompt templates 122*c* responsive to a single set of vocabulary item parameters 114 to obtain a coordinating set of content items 130*c*. The vocabulary item generating engine 134 may store the content item 130*c* to a vocabulary item bank 126*c*.

Although illustrated as having a particular flow and a particular division of engines, in other implementations, the process 100 may include one or more additional stages and/or certain stages may be merged. For example, the vocabulary item generating engine 134 may include sub-modules that are particular options within assessment item generation, handled by the assessment item generating engine 128. In another example, content items may all be stored to a general content item bank, rather than being separated into specialized content item banks. Further, for example as described below in relation to FIG. 5A and FIG. 5B, a different set of content types may be included than is represented in the process 100. Other modifications of the process 100 are possible.

Figure 1C:
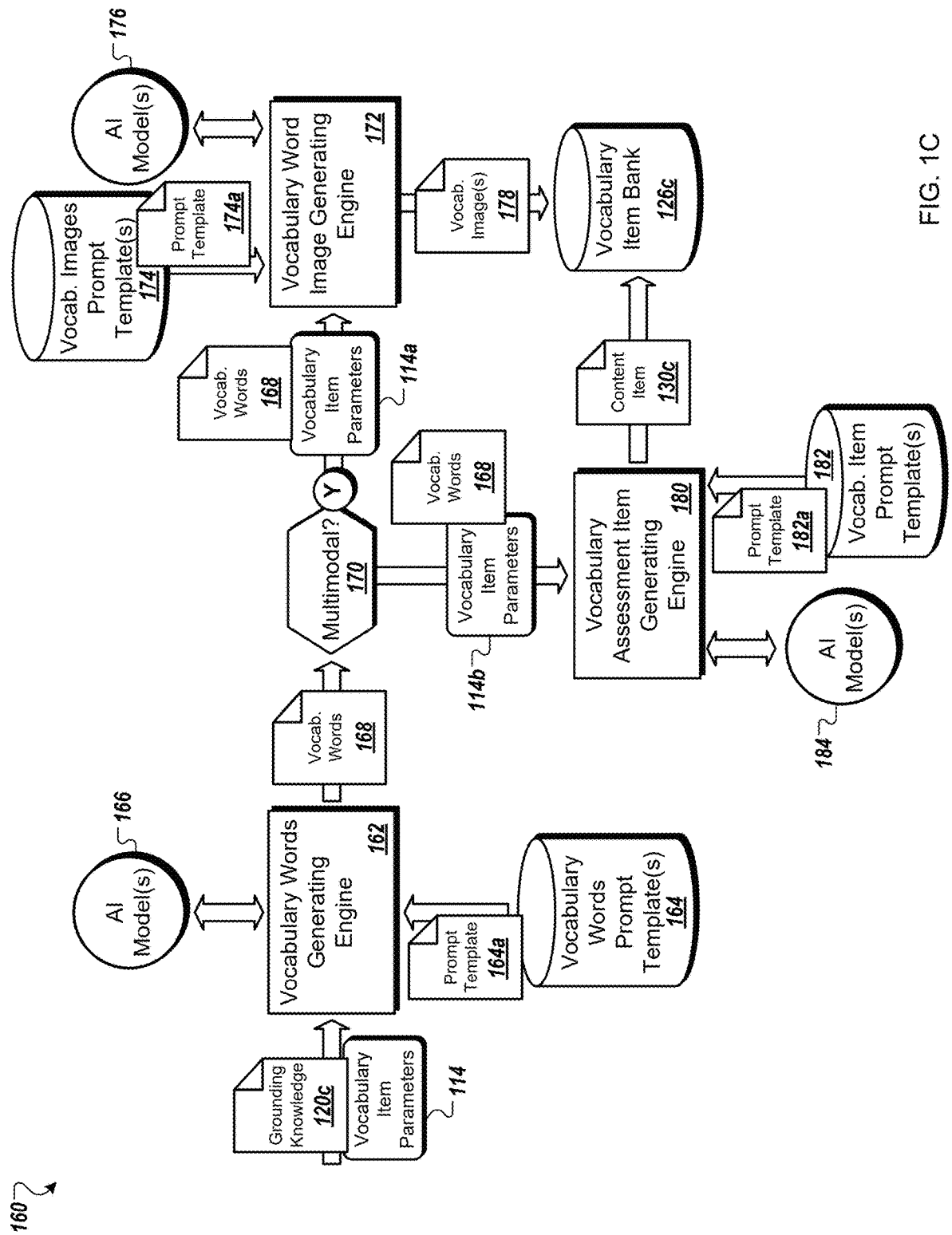
FIG. 1C illustrates a flow diagram of an example process for creating vocabulary content items.

Turning to FIG. 1C, an example expanded process 160 for vocabulary item creation is presented. The expanded process 160, for example, may represent multiple stages of processing that may take place within the vocabulary item generating engine 134 to produce the content item(s) 130*c*.

In some implementations, the process 160 begins with obtaining, by a vocabulary words generating engine 162, the grounding knowledge 120*c* and the vocabulary item parameters 114. The grounding knowledge 120*c*, for example, may include a reading passage, transcript of multi-media learning content, and/or lesson plan structure containing terminology that may be identified as vocabulary words based, for example, on a subject (e.g., subject matter identifier(s) 102) and/or a target audience.

In some implementations, the vocabulary words generating engine 162 accesses a prompt template 164*a* from a vocabulary words prompt template data store 164 and generates a prompt for instructing one or more AI models 166 to identify a set of vocabulary words 168 using the grounding knowledge 120*c*. The set of vocabulary words 168, in turn, may be presented to an end user for review and approval and/or selection from within a larger set of proposed vocabulary words produced by the AI model(s) 166. The user, in a further example, may be provided the opportunity to add one or more customized vocabulary words and/or to adjust a proposed vocabulary word (e.g., modify the tense of a verb, update a noun form to a verb form of a term, etc.). In some embodiments, each vocabulary word of the vocabulary word set 168 is generated separately (e.g., each generated by prompting either a different AI model 166 or the same AI model 166 and using a separate prompt template 164). In some embodiments, two or more vocabulary words may be generated together as a set (e.g., by a same AI model 176 according to a single prompt template 164*a*).

In some implementations, once the set of vocabulary words 168 has been identified, if the user has requested a multimodal vocabulary content item (170), the vocabulary words 168, along with at least a portion of the vocabulary item parameters 114a, are provided to a vocabulary word image generating engine 172. The vocabulary word image generating engine 172, for example, may be configured to identify, for each vocabulary word of the set of vocabulary words, a corresponding graphic, animated graphic, or short video. In illustration, based on the vocabulary word "locomotive," the vocabulary word image generating engine 172 may produce, through interaction with one or more AI models 176, a corresponding image. While not illustrated, at least a portion of the grounding knowledge 120c may be provided to the vocabulary word image generating engine 172. The AI model(s) 176, for example, may use contextual cues in identifying an appropriate image to one or more vocabulary words of the set of vocabulary words 168.

In some implementations, the vocabulary word image generating engine 172 accesses a vocabulary images prompt template 174a from a vocabulary images prompt template data store 174 and generates, using the prompt template 174a, a customized prompt for instructing the vocabulary image AI model(s) 176 to provide an appropriate image for each vocabulary word of at least a portion of the set of vocabulary words 168. The customized prompt, in some examples, may include indicators from the vocabulary item parameters 114a related to the style of image (e.g., cartoon, photographic, line art, etc.), the color scheme of the image (e.g., pastels, brights, grayscale, etc.), and/or a format of the image (e.g., bordered or cropped in a selected shape such as square or circle, transparent background, solid background of a selected color such as white, etc.).

In some implementations, the vocabulary word image generating engine 172 obtains, through prompting at least one of the vocabulary image AI models 176, one or more vocabulary images 178. Multiple prompts may be submitted, for example, each prompt identifying a particular vocabulary word and one or more context examples where the vocabulary word is used in the grounding knowledge 120c. Further, the different prompts may be associated with different prompt templates 174 and/or different AI models 176. The AI model(s) 176, further, may provide multiple image options associated with each vocabulary word, such as the image indicators listed above.

In some implementations, an end user is presented with the image(s) for review and approval. The user, for example, may be presented with multiple images per vocabulary word and provided interactive controls for selecting a preferred image. The user, further, may be provided the opportunity to submit instructions for adjusting a selected image, for example to adapt a style of the image or to adapt the contents of the image. In illustration, the end user may indicate that an image of a space shuttle should be depicted "in space with stars" instead of the presented image of the space shuttle on a launch pad.

Upon approval of the vocabulary images 178, in some implementations, the vocabulary images 178 are stored to a vocabulary item bank 126c as an element of a content item being built using the process 160. In some implementations, the vocabulary word image generating engine 172 stores the vocabulary images 178 along with metadata identifying the corresponding vocabulary words 168, the particular prompt template 174a, and/or the particular AI model(s) 176 used to produce the vocabulary images 178. Further, the metadata may include a date and/or timestamp, a unique identifier associated with each image 178, alternative text for presenting in lieu of the image, identification of an end user who provided the request for content item generation, and/or identification of a design team and/or educational organization associated with generation of the vocabulary images 178. If the user submitted instructions for adjusting one or more images, the metadata may include both original metadata associated with the original image as well as updated metadata associated with the updated image. For example, the updated metadata may be used at a later time to inform the system of user preferences.

Whether or not a multimodal content item is desired (170), in some implementations, a set of vocabulary item parameters 114b (e.g., at least a portion of the vocabulary item parameters 114) and the vocabulary words 168 are obtained by a vocabulary assessment item generating engine 180 for generating a content item 130c for assessing a learner's vocabulary comprehension. The vocabulary item parameters 114b, in some examples, may include one or more of a subject area, a target audience, one or more learning standard frameworks, and/or one or more vocabulary assessment strategies (e.g., indication of the tactic of the content item, such as context clues, analogies, synonym/antonym comparison, root/affix identification, etc.). A portion of the vocabulary item parameters 114b may be drawn from the subject matter identifier(s) 102 of FIG. 1A.

The vocabulary assessment item generating engine 180, in some implementations, accesses a vocabulary item prompt template 182a from a vocabulary item prompt template data store 182. The vocabulary item prompt template data store 182, for example, may include multiple prompt templates, each prompt template appropriate to certain styles (e.g., menu selections, multiple choice option pattern, term and/or phrase input(s), etc.) of vocabulary item parameters 114b and/or vocabulary assessment item strategies (e.g., learning module type). The vocabulary assessment item prompt template 182a, for example, may be an artificial intelligence (AI) model prompt architecture (e.g., fill-in-the-blank style form, scripting language algorithm, etc.) designed to produce wording, when combined with vocabulary item parameters 114b and vocabulary words 168, that is prompt engineered for obtaining consistent, reliable results from a corresponding AI model 184 tuned for receiving unique inputs from users arranged within the constructs of the prompt template 182a.

In some implementations, the vocabulary assessment item generating engine 180 combines the vocabulary item parameters 114b with the prompt template 182a and the vocabulary words 168 to produce input for a given AI model of one or more AI models 184. The vocabulary assessment item generating engine 180, for example, may produce one or more model prompts designed to communicate a request to at least one AI model of the one or more AI models 184 based on the vocabulary assessment item parameters 114b and the vocabulary words 168. The vocabulary assessment item generating engine 180 may supply the one or more model prompts to one or more of the AI model(s) 184.

Responsive to the vocabulary assessment item generating engine 180 providing the one or more model prompts to the one or more AI model(s) 184, in some implementations, each of the AI model(s) 184 prompted by the vocabulary assessment item generating engine 180 returns an AI-generated content item 130c or portion thereof. The content item 130c, for example, may include text designed for use in providing a learner with an interactive learning assessment (e.g., a multiple-choice quiz, a fill-in-the-blank quiz, a matching game, etc.) corresponding to the vocabulary item parameters 114b and based on the vocabulary words 168.

Aspects of the content item 130c, in some examples, may include stimulus passages for filling in the blank, a set of correct answers, sets of wrong answers for presenting in relation to each assessment prompt in a multiple-choice style assessment item, and/or identification of matching items in a matching quiz. Further, the content item 130c may include, for each vocabulary word 168, metadata identifying one or more of a part of speech, a definition, text-based a phonetic pronunciation, and/or an audio-based phonetic pronunciation, in some examples.

Figure 3A:
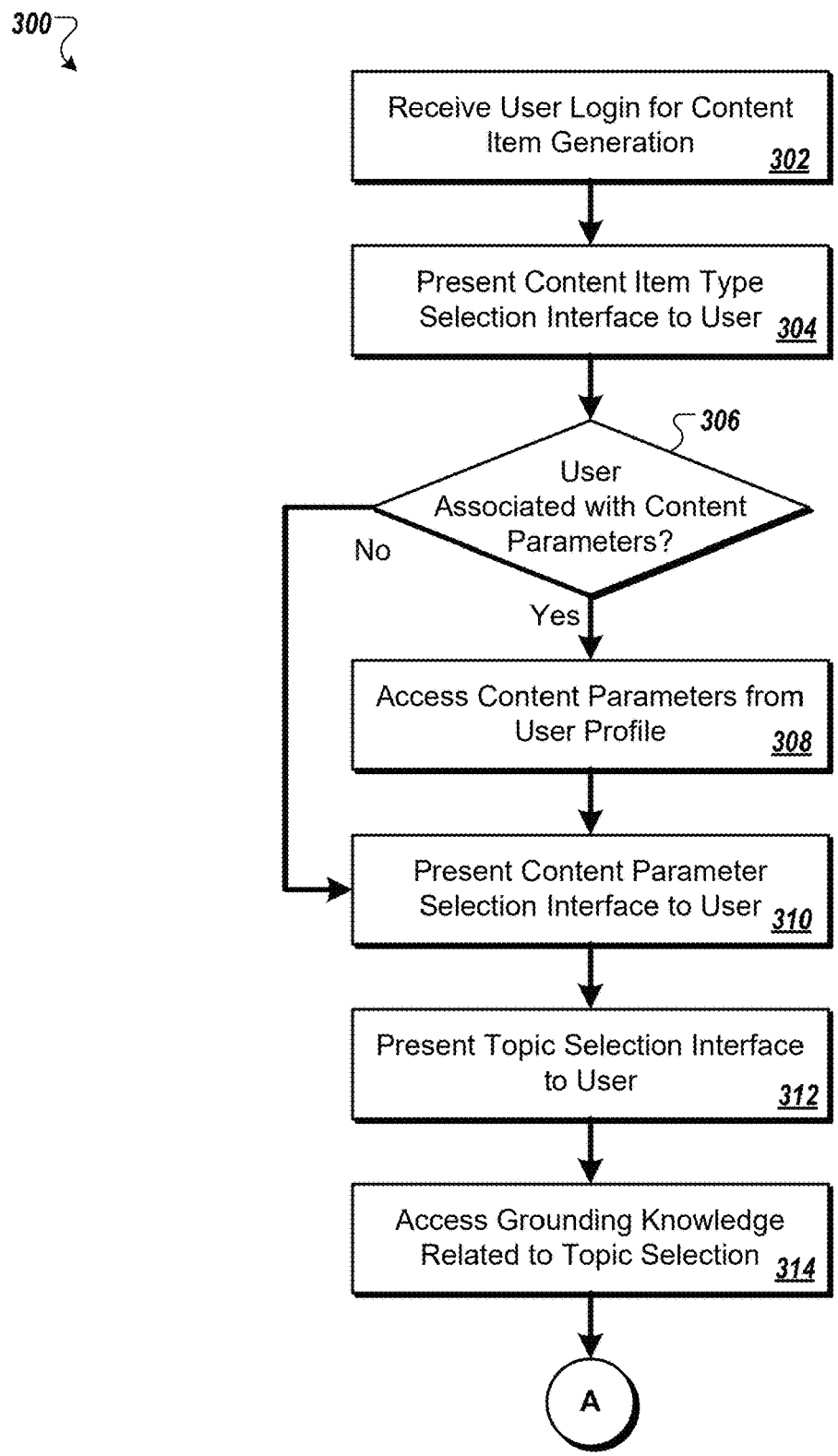
FIG. 3A and FIG. 3B illustrate a flow chart of an example method for guiding a user through content item generation via a series of graphical user interfaces.
Figure 3B:
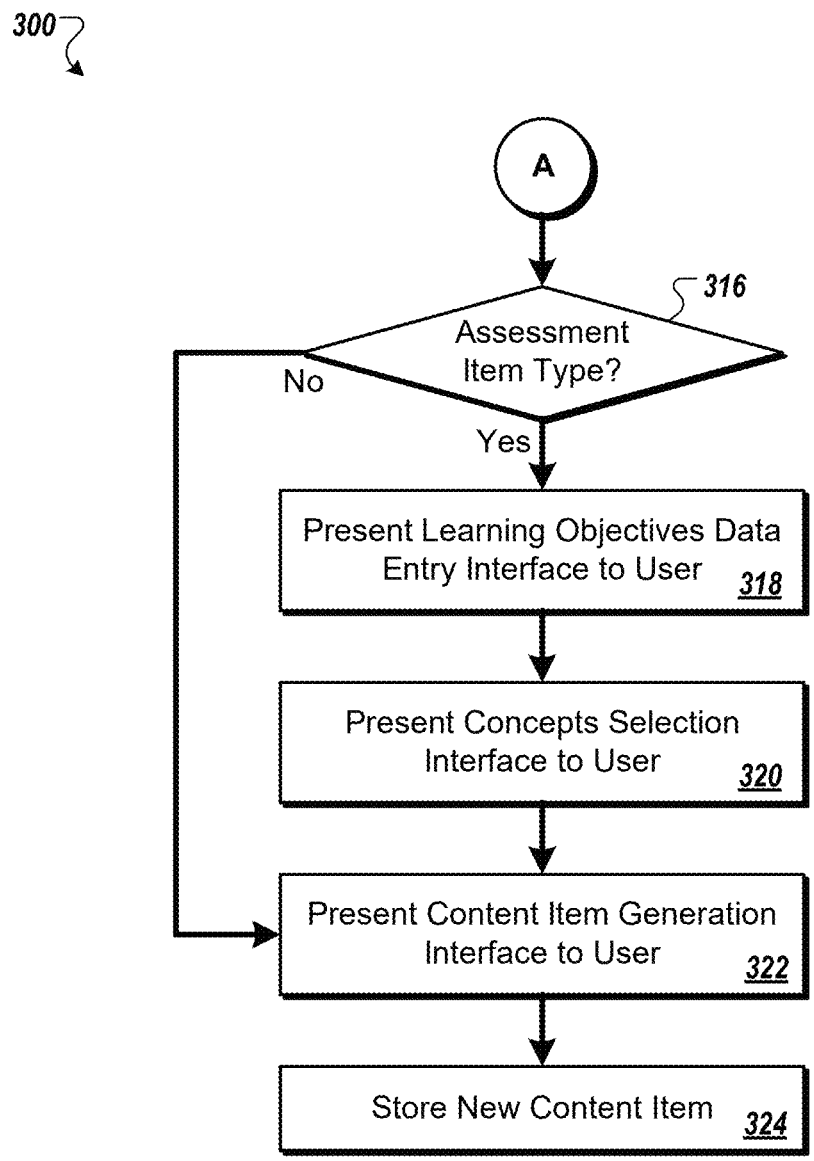

Turning to FIG. 3A and FIG. 3B, a flow chart illustrates an example method 300 for providing a user interface configured to lead a content developer or educator through the process of generating a new content item. Portions of the method 300, for example, may be performed during creation of the content items 130a, 130b, and 130c as described in relation to FIG. 1A, during development of the learning objectives 148 and/or the learning concepts 156 as described in relation to FIG. 1B, and/or during the development of the vocabulary images 178 and content item 130c as described in relation to FIG. 1C.

Turning to FIG. 3A, in some implementations, the method 300 begins with receiving a user login for content item generation (302). For example, a user may be logged into a content development platform, portal, or application supporting AI-assisted content generation. The user, for example, may be associated with a user identifier, a group identifier (e.g., team, department, school district, etc.), and/or user access level(s) (e.g., access to certain types of grounding knowledge, certain types of content items, certain levels of sophistication of data entry when producing content items, etc.).

In some implementations, a content item type selection interface is presented to the user (304). The content item type selection interface, for example, may include one or more icons, drop-down menus, menu tabs, or other navigational controls for selecting a content item type. In some examples, the content item types may include assessment items, vocabulary items, and/or reading passages. Further, in some certain embodiments, the content item categories may be broken down further (e.g., video assessment items, image assessment items, text assessment items, etc.). In some embodiments, one or more navigational controls may be provided to navigate to stored content items and/or in-progress content items.

In some implementations, if the user is associated with one or more content parameters (306), the content parameters are accessed from the user profile (308). The content parameters, in one example, may include one or more content item banks associated with the user, such as the content item banks 126a, 126b, and 126c of FIG. 1A. The content item banks, for example, may be data locations where the user has stored previously-generated content items and/or data locations the user otherwise has read or read/write privileges to (e.g., data locations associated with the user's group). In another example, the content parameters may include parameters that limit the scope of content development based upon the role of the user such as, in some examples, one or more audience parameters (e.g., grade level for a school teacher user, age range for a preschool instructor user, etc.), one or more subject parameters (e.g., subjects that the instructor teaches), and/or one or more learning standard parameters (e.g., learning standards applied at a school or district level associated with an instructor user).

In some implementations, a content parameter selection interface is presented to the user (310). The content parameter selection interface, for example, may provide one or more user interface controls for setting content parameters. The content parameter options, in some examples, may include grade or grade range, age or age range, learning standard(s), and/or learning environment (e.g., preschool, elementary school, middle school, high school, etc.). If content parameters were accessed from the user profile (308), the content parameters may limit the user's options for content selection (e.g., to a particular range of audience, a certain set of subjects, etc.). In other embodiments, where content parameters were accessed from the user profile, the user is not presented with the opportunity to select content parameters.

Figure 4A:
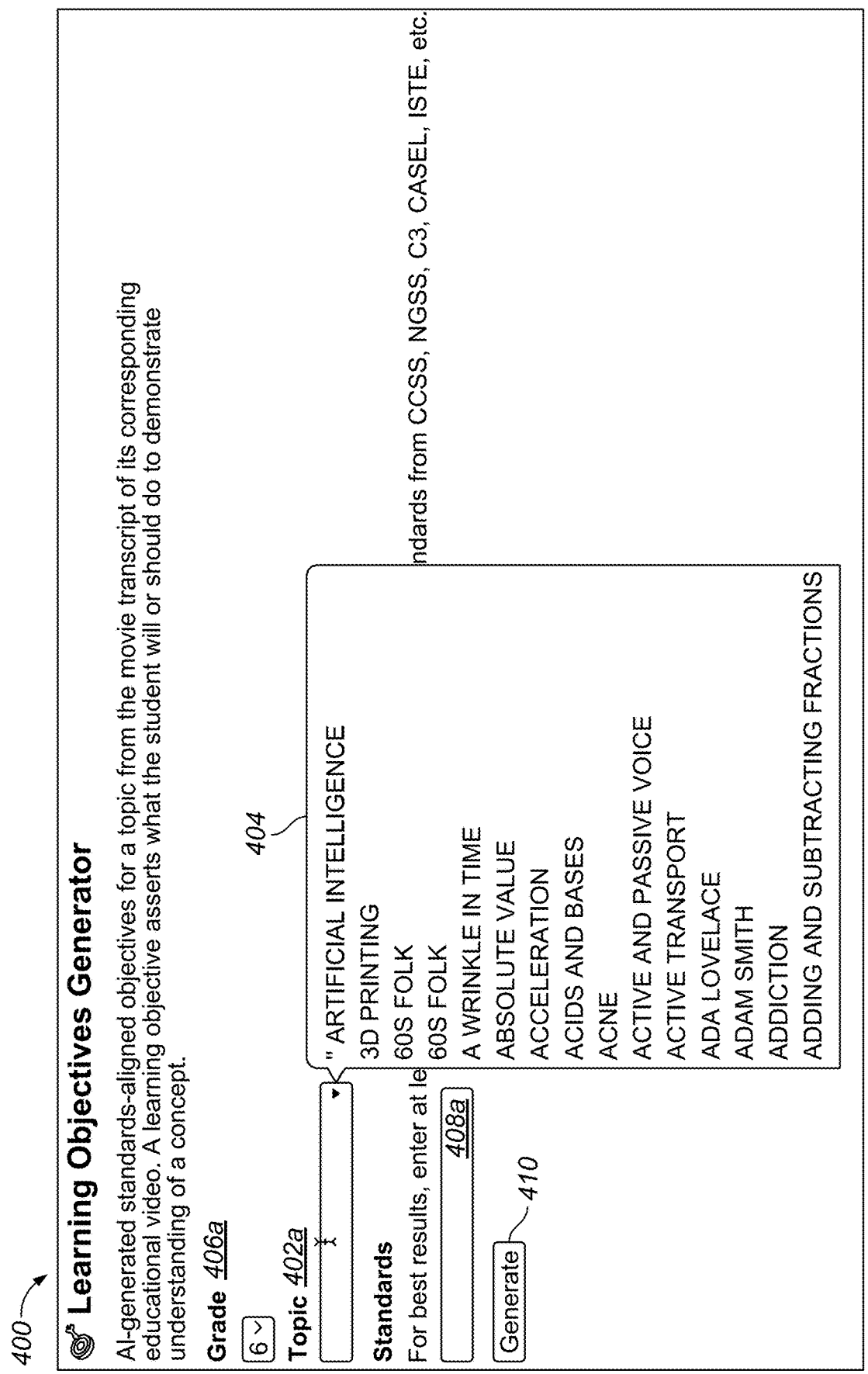

In some embodiments, content parameter selection is one option within a larger user interface experience for selecting a learning objective and/or a subject-specific concept. Turning to FIG. 4A, for example, a learning objectives generator user interface 400 is presented for developing AI-generated standards-aligned objectives for a selected topic. Each topic, as indicated, may relate to the movie transcript grounding knowledge of a certain learning video available within an online learning platform. As illustrated, the learning objectives generator user interface includes a grade drop-down menu 406 (set to grade 6, as illustrated) for selecting a grade level content parameter.

Returning to FIG. 3A, in some implementations, a topic selection user interface is presented to the user (312). The topic selections, for example, may each relate to one or more documents, sets, or collections of grounding knowledge, such as the grounding knowledge 106 described in relation to FIG. 1A. If content parameters were accessed from the user profile, in some embodiments, the available topic selections are filtered based on the content parameters, for example to limit availability to subject(s) associated with the content developer. In other embodiments, the user may be provided the opportunity to filter the topics based on one or more selections available via the user interface, such as audience filters and/or subject filters. The topic selection user interface, for example, may present topics related to a particular subject or subjects and/or focused toward a particular audience. The user may be provided one or more controls for selecting a particular topic. In some examples, the topic may be selected via one or more content menus, through submitting a search parameter, and/or via a drop-down menu.

For example, turning to FIG. 4A, a topic drop-down menu 402 of the learning objectives generator user interface 400, upon selection, presents a list of topics 404 to the user. In the illustrated example, the topics visible within the user interface 400 include "Artificial Intelligence," "3D printing," "60s Folk," "A Wrinkle in Time," "Absolute Value," "Acceleration," "Acids and Bases," "Acne," "Active and Passive Voice," "Active Transport," "Ada Lovelace," "Adam Smith," "Addiction," and "Adding and Subtracting Fractions." As can be seen, the topics include a wide variety of subject matter (e.g., science, music, literature, mathematics, grammar, history, etc.). In other embodiments, the user interface 400 may include a subject filter to limit the presentation of topics in the topic drop-down menu 402.

Returning to FIG. 3A, in some implementations, based on the selected topic, grounding knowledge related to the topic selection is accessed (314). For example, as described in relationship to the user interface 400 of FIG. 4A, the movie transcript corresponding to the selected topic may be accessed for use in content item generation. The grounding knowledge, for example, may be accessed by the grounding knowledge collection engine 104 from the grounding knowledge repository 106, as described in relation to FIG. 1A.

Turning to FIG. 3B, if the user desires an assessment type content item (316) (e.g., as selected via the content item type selection interface at operation 304), in some implementations, a learning objectives data entry interface is presented to the user (318). The learning objectives data entry interface, in some examples, includes at least one data entry control for selecting or entering a learning objective related to the new assessment type content item. The learning objectives data entry interface, for example, may include categories or levels of objectives, such as the Bloom's Taxonomy of levels of learning (e.g., remember, understand, apply, analyze evaluate, create). The categories of learning objectives, in another example, may depend on the topic (or more generalized subject) of the grounding knowledge accessed at operation 314.

In some embodiments, the learning objectives data entry interface is configured to accept, from a bound set of options, information to use, in combination with the grounding knowledge, to prompt one or more AI models to automatically generate a set of learning objectives for consideration by the end user. For example, the learning objectives data entry interface may provide data entry controls for collecting at least a portion of the learning objective parameters 112a to combine with the prompt template 144a to request generation of learning objectives from the AI model(s) 146, as described in relation to FIG. 1B. Turning to the user interface screen 400 of FIG. 4A, for example, the controls may include the grade level control 406, the topic selection control 402, and a learning standards data entry control 408 (e.g., the learning standards 210 as described in relation to FIG. 2). A generate control 410, upon selection, may trigger AI generation of one or more learning objectives, as described for example in relation to the learning objectives generating engine 142 of FIG. 1B.

Turning to FIG. 4B, an updated learning objectives user interface screen illustrates, responsive to selection of the generate control 410, a set of results 422, each associated with a respective checkbox control for approving of the corresponding result. The results 422, for example, include: "students will be able to explain how natural selection leads to the evolution of new species;" "students will be able to identify and describe the role of environmental pressures in natural selection;" and "students will be able to analyze evidence from the fossil record and other sources to support the theory of evolution through natural selection." Further, each of the results 422 is presented along with a corresponding set of applicable learning standards 424: "(MS-LS4-4, CCSS.ELA-LITERACY.RI.8.4);" "(3-LS4-2, CCSS.ELA-LITERACY.RI.8.4);" and "(MS-LS4-4, CCSS.ELA-LITERACY.RI.8.4)." The user may select, via the checkbox controls, one or more of the learning objective results 422 and select an "add to item bank" control 426 to add the selected learning objective result(s) to the item bank (e.g., the assessment item bank 126b as discussed in relation to FIG. 1B).

Returning to FIG. 3B, in some implementations, as part of the assessment item type content item generation process, a concepts selection interface is presented to the user (320). The concepts selection interface, for example, may include entry of one or more learning objectives (e.g., as derived through the learning objectives data entry interface described at operation 318) as well as, in some embodiments, additional learning concept parameters (e.g., the learning concept parameters 158 of FIG. 1B) such as, in some examples, a topic, a subject, and/or an audience. Using the data entered by the user, one or more artificial intelligence models may generate subject-specific learning concepts that are aligned to the identified topic and anchored to the user's identified learning objective. Learning concepts, in some examples, may represent an idea, theme, process, or event that is testable. The learning concepts, for example, may be generated as described in relation to the learning concepts generating engine 150 of FIG. 1B.

Turning to FIG. 4C, an example graphical user interface (GUI) screen 430 illustrates a concepts generator data entry display for automatically generating a learning concept based on information collected from a user via a set of data entry controls. As illustrated, the GUI screen 430 includes an item bank control 432a that, upon selection, allows the user to pull up saved information related to an in-progress assessment item content item, including any learning objectives saved when interacting with the learning objectives generator user interface 420 of FIG. 4B. The save items in the item bank presented upon selection of the item bank control 432a, for example, may include a list or spreadsheet detailing data previously stored by the user (or, in some embodiments, including data previously stored by others and shared with the user, such as team members of the user).

As illustrated, a row identifier text box 434a presents a row number associated with data selected by the user from the item bank via the item bank control 432a. Additional text box controls, including a topic control 402b, a subject control 438a, and an objective control 440a, may each be populated with information derived from data stored to the item bank at the row (e.g., 38) identified in the row identifier text box 434a. This information, for example, may correspond to at least a portion of the learning concept parameters 158 of FIG. 1B. For example, as illustrated, the text in the topic control 402b matches the topic 402a of FIG. 4A and may have been automatically filled in based on the selected row ID in control 434a. In some embodiments, the user is provided the opportunity to amend the text populated in one or more of the controls 402b, 438a, and 440a and/or fill in new information for the controls 402b, 438a, and 440a. In either circumstance, the adjusted data may be saved by the user through interaction with a "save as new row" control 442a, which saves the modified or new information to the item bank.

In some implementations, once the user has approved of the information presented in the topic control 402b, the subject control 438a, and the objective control 440a, the user may activate a generate control 444 to cause one or more AI models to translate the learning objective and supporting information into a learning concept 446. The generate control 444, upon selection, may provide the information in the controls 402b, 438a, and 440a to the learning concepts generating engine 150 of FIG. 1B. As illustrated, a single learning concept 446 is presented to the user ("The role of environmental pressures in natural selection"). However, in other embodiments, two or more alternative learning concepts may be presented to the user for selection.

To accept the AI-proposed learning concept 446, in some implementations, the user activates an "add to item bank" control 448 to store the learning concept 446 to the selected row 434a of the item bank. Conversely, the user may adjust the information in one or more of the controls 402b, 438a, and/or 440a to produce a new learning concept proposal from the AI.

Returning to FIG. 3B, in some implementations, whether or not the content item type is an assessment item type (316), a content item generation interface is presented to the user (322). The content item generation interface, for example, may include a structured set of controls for collecting parameters for use in prompting one or more AI models, such as, in some examples, the reading item parameters 110, the assessment item parameters 112, and/or the vocabulary item parameters 114 of FIG. 1A. The content item generation interface, in some embodiments, provides the user with controlled options via drop-down menus and/or multiple-choice selection controls (e.g., check boxes, radio buttons, etc.). In some embodiments, the content item generation interface includes text box controls labeled with specific types of information for the user to provide, such as information regarding the subject, topic, audience, and/or learning standards. The content item generation interface, in one example, may be reached through a control provided within a learning item review screen (e.g., the content from which the grounding knowledge of operation 314 derived), such as a video content review screen. In another example, the content item generation interface may be presented responsive to submission of information via a prior interface, such as the learning objectives data entry interface of operation 318 and/or the concepts selection interface of operation 320.

In some implementations, turning to FIG. 4D, a first portion 450a of an item generator user interface 450 is presented to a user for obtaining customized information to merge with a prompt template to prompt one or more AI models in generating a new content item. The item generator user interface 450, for example, may be presented in response to the user adding the presented concept 446 to the item bank using the add to item bank control 448, as described in relation to FIG. 4C. In another example, the item generator user interface 450 may be navigated to via a content development platform menu.

The user, in some embodiments, has the option to select an item bank control 432b for accessing stored content item information from an item bank, as described in relation to the item bank control 432a of FIG. 4C. Selection of a certain row or record of the item bank, for example, may result in auto-population of one or more of the control boxes presented in the user interface 450, such as a topic control 402c, a subject control 438b, a grade level control 406b, a learning standards control 408b, an objective control 440b, and/or a concept control 452 (e.g., corresponding to a concept saved via the concepts generator user interface 430 of FIG. 4C). As illustrated, the identifier of the selected row or record may be presented in a row ID control 434b.

In some embodiments, the user is presented with controls for providing additional information related to content generation (e.g., content item parameters) such as a depth of knowledge (DOK) drop-down menu control 454 for entering a level of knowledge for the target audience related to the selected topic identified via the topic control 436b and/or an item type drop-down menu control 456 configured to present, upon selection, a set of item types 458 for generation by the AI model(s). As illustrated, the set of item types 458 includes multiple choice, multiple select, fill in the blank, text highlight, and label image.

Further, in some embodiments, the user is provided the opportunity to amend the text populated in one or more of the controls 402c, 438b, 406b, 408b, 440b, and/or 452, and/or fill in new information for the controls 402c, 438b, 406b, 408b, 440b, and/or 452. In either circumstance, the adjusted data may be saved by the user through interaction with a "save as new row" control 442b, which saves the modified or new information to the item bank.

Turning to FIG. 4E, a bottom portion 450b of the item generator user interface 450 is illustrated. As shown, beneath the item type selection control 456, a generate control 458 is presented for causing generation of the content item. For example, activation of the generate control 458 may cause one or more AI models to generate question-answer sets corresponding to the selected item type of the set of item types 458 ("Multiple Select"). For example, the generate control 458, upon selection, may provide the information in the controls 402c, 438b, 406b, 408b, 440b, 452, and 454 to the assessment item generating engine 128 of FIG. 1A (e.g., as assessment item parameters 112).

Responsive to activation of the generate control 458, in some implementations, content item generation results 460 are presented to the user. As shown, the results 460 include an instruction 462 ("Choose all that apply"), a question 464 ("What role do environmental pressures play in natural selection?"), a set of correct answers 466, and a set of distractors 468. An add to item bank control 470 is provided to add the contents of the results 460 to the item bank (e.g., the assessment item bank 126b as discussed in relation to FIG. 1B).

As illustrated, the set of correct answers 466 includes: "Determine which variations are favorable;" "Limit the population of living things;" and "Cause certain variations to help organisms survive." The number of correct answers 466 may vary upon implementation. In some embodiments, each correct answer may be editable by the end user (e.g., to change "living things" to "living organisms") and/or individually selectable to accept only a subset of the proposed correct answers.

Similarly, the set of distractors 468 includes three proposed phrases, each of which, in some embodiments, may be editable by the end user and/or individually selectable to accept only a subset of the proposed distractors. As illustrated, the set of distractors 468 includes: "Increase the number of offspring produced;" "Help organisms adapt to new environments;" and "Make organisms more similar to each other."

Although described in relation to generating an assessment item, generation of a reading passage item or a vocabulary item may include a similar user interface, where the item types may differ from the presented item types 458 and/or one or more of the controls may be different or missing (e.g., no learning objectives control 440b or concepts control 452 when generating a reading passage item).

Returning to FIG. 3B, in some implementations, the new content item is stored (324). As discussed in relation to FIG. 1A, the content item may be stored to the reading passage item bank 126a, the assessment item bank 126b, or the vocabulary item bank 126c.

Although described as a particular flow of operations, in other embodiments, certain operations of the method 300 may be performed in a different order and/or concurrently. For example, the user's content parameters may be accessed (308) prior to presenting the content item type selection interface (304). In further embodiments, the method 300 may include more or fewer operations. For example, as illustrated in FIG. 4D and FIG. 4E, topic selection (312) may be rolled into the content item generation interface (322). Other modifications of the method 300 are possible.

Figure 5A:
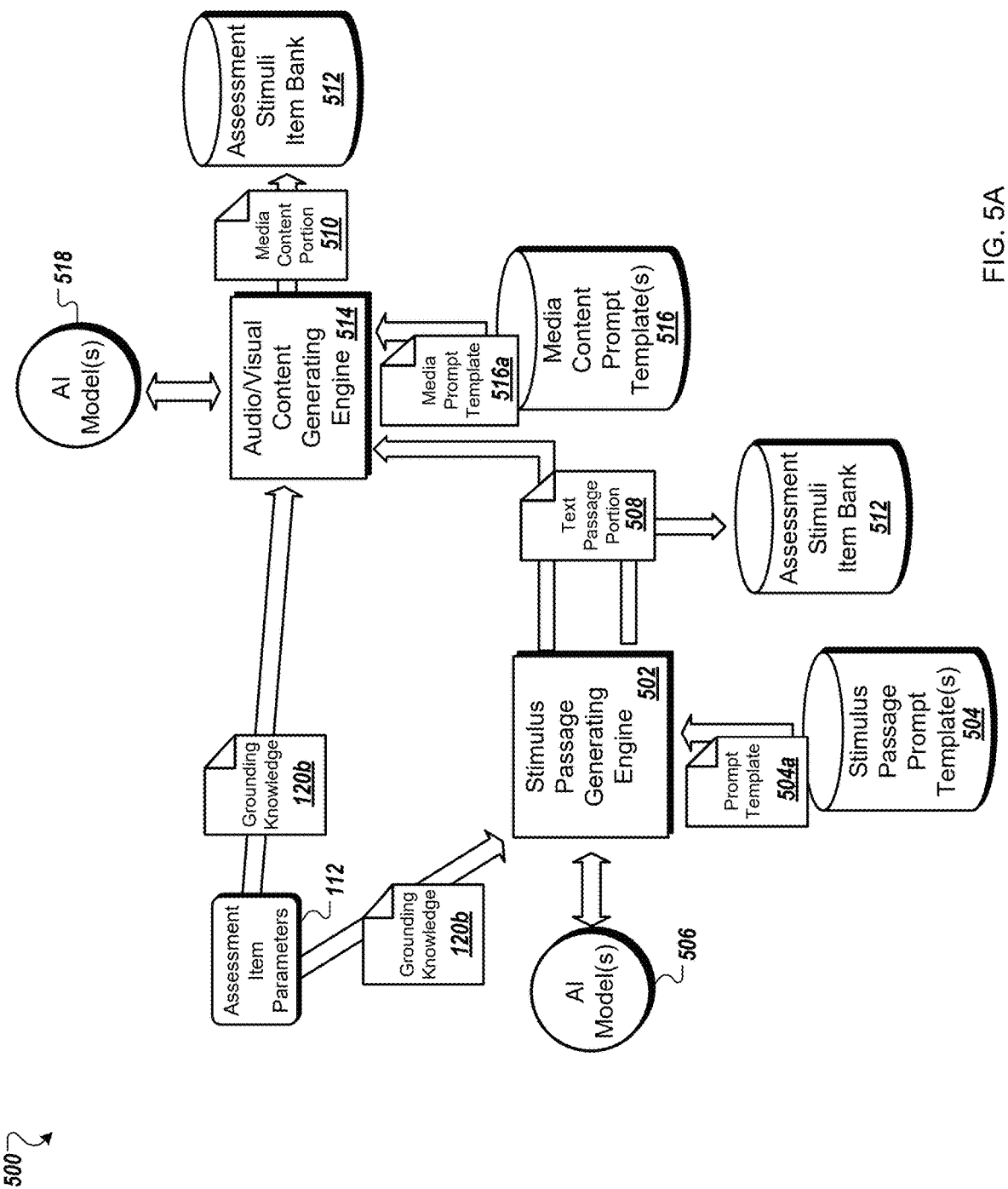
FIG. 5A and FIG. 5B illustrate flow diagrams of example processes for creating multi-part content items.

In some implementations, systems and methods of the present disclosure may be used to craft multimodal presentations, such as practice tests incorporating test questions with example graphs or other audio/video content. Turning to FIG. 5A, a flow diagram 500 illustrates an example process 500 for using assessment item parameters 112 as described in relation to FIG. 1 to generate stimulus items incorporating text passages with audio and/or visual content.

In some implementations, the grounding knowledge 120*b* (e.g., used to create the assessment items 130*b* stored to the assessment item bank 126*b* which provide, for example, test questions), is provided along with the assessment item parameters 112 to a stimulus passage generating engine 502 to generate a stimulus passage (e.g., a reading passage, instructions for reviewing or referencing graphic content when answering assessment item questions, etc.).

The stimulus passage generating engine 502, in some implementations, accesses a stimulus passage prompt template 504*a* from a stimulus passage prompt template data store 504. The stimulus passage prompt template data store 504, for example, may include multiple prompt templates, each prompt template appropriate to a particular type of grounding knowledge 120*b*, an assessment item level or target audience (e.g., language skill level of the end learner), certain styles of content (e.g., instructions for performing the assessment, instructions for interacting with associated audio and/or video content, etc.), and/or certain styles of audio and/or visual content (e.g., brief video, graph, interactive graph, diagram, multiple choice illustrations, etc.) identified in the assessment item parameters 112. Certain assessment item parameters 112, for example, may be based on a user interface presented to the requester in generating the assessment item parameters 112 and/or selecting the grounding knowledge 120*b*. This may, in turn, depend upon the sophistication of the end user (e.g., a professional content designer versus an educator interfacing with the system as a customer). The stimulus passage prompt template 504*a*, for example, may be an artificial intelligence (AI) model prompt architecture (e.g., fill-in-the-blank style form, scripting language algorithm, etc.) designed to produce wording, when combined with assessment item parameters 112 and fed the grounding knowledge 120*b*, that is prompt engineered for obtaining consistent, reliable results from a corresponding AI model 506 tuned for receiving unique inputs from users arranged within the constructs of the prompt template 504*a*.

In some implementations, the stimulus passage generating engine 502 combines the assessment item parameters 112 with the prompt template 504*a* and the grounding knowledge 120*b* to produce input for a given AI model of one or more AI models 506. The stimulus passage item generating engine 502, for example, may produce one or more model prompts designed to communicate a request to at least one AI model of the one or more AI models 506 based on the assessment item parameters 112 and grounding knowledge 120*b*. The stimulus passage item generating engine 502 may supply the one or more model prompts via the prompt template 504*a* to one or more of the AI model(s) 506.

Responsive to the stimulus passage item generating engine 502 providing the one or more model prompts to the one or more AI model(s) 506, in some implementations, each of the AI model(s) 506 prompted by the stimulus passage item generating engine 502 returns an AI-generated text passage or portion thereof, illustrated as a text passage portion 508 of the assessment stimuli item. The text passage portion 508, for example, may include text designed to introduce, explain, or enrich a learner's understanding of a corresponding media (e.g., audio, graphic, and/or video) portion 510 of the assessment stimuli item. The text passage portion 508 may include a message such as, in some illustrative examples, "See FIG. 3," "Listen to this audio prior to answering the questions," or "play the accompanying video first."

In some implementations, the stimulus passage item generating engine 502 stores the text passage portion 508 to an assessment stimuli item bank 512. The stimulus passage item generating engine 502 may store the text passage portion 508 along with metadata identifying the assessment item parameters 112, the grounding knowledge 120*b*, the particular prompt template 504*a*, and/or the particular AI model(s) 506 used to produce the text passage portion 508. Further, the metadata may include a date and/or timestamp, a unique identifier associated with the text passage portion 508, a unique identifier associated with each of the text passage portion 508 and the media content portion 510 (e.g., together, an assessment stimuli item), identification of an end user who provided the request for content item generation, and/or identification of a design team and/or educational organization associated with generation of the text passage portion 508 (e.g., a group ownership). In some examples, the metadata may include a topic, a subject, one or more learning standards, a set of assessment items corresponding to the text passage portion 508, a grade or grade range, a reading framework level, and/or a readability index level.

The text passage portion 508, in some implementations, is presented to an end user for review and approval. In some embodiments, the text passage portion 508 is presented in combination with an audio and/or video portion derived from the grounding knowledge 120*b* (e.g., provided as an input by the user). In other embodiments, the text passage portion 508 will be presented in combination with the media portion 510 generated by the process 500 for review and approval. Further, in some embodiments, the end user may have the option to edit the text passage portion 508. The user, for example, may submit feedback that is used, by the stimulus passage item generating engine 502, to adjust the assessment item parameters 112 and/or include additional grounding knowledge 120*b* to update the prompting of the AI model(s) 506. The assessment stimuli item bank 512, in some implementations, tracks metadata related to iterations of adjustments to the text passage portion 508. For example, the adjustment tracking metadata may be used at a later time to inform the system of user preferences (e.g., to auto-generate a portion of the assessment item parameters 112, recommend default values of a portion of the assessment item parameters 112 to the end user, etc.).

As indicated above, in some embodiments, the corresponding audio and/or visual portion of the assessment stimuli item may be derived from the grounding knowledge 120*b*. This audio and/or visual portion may be stored, by the stimulus passage generating engine 502, to the assessment stimuli item bank 512 along with the automatically generated text passage portion 508. In other embodiments, the process 500 is configured to automatically generate both the text passage portion 508 and the media content portion 510 based on the assessment item. This path of the process 500 is referred to as multi-modal generation of assessment stimuli items.

In some implementations involving automated generation of a multi-modal assessment stimuli item, the text passage portion 508, along with the assessment item parameters 112 and the grounding knowledge 120*b*, are obtained by an audio and/or visual content generating engine 514 for generation of the media content portion 510. The audio and/or visual content generating engine 514, although illustrated as a single engine, may include multiple engines, each engine particular to a specific media content type (e.g., audio, video, still graphic, etc.).

The audio and/or visual content generating engine 514, in some implementations, accesses a media content prompt template 516*a* from a media content prompt template data store 516. The media content prompt template data store 516, for example, may include multiple prompt templates, each prompt template appropriate to a particular type of grounding knowledge 120b, an assessment item level or target audience (e.g., language skill level of the end learner), and/or certain styles of audio and/or visual content (e.g., brief video, graph, interactive graph, diagram, multiple choice illustrations, etc.) identified in the assessment item parameters 112. The media prompt template 516a, for example, may be an artificial intelligence (AI) model prompt architecture (e.g., fill-in-the-blank style form, scripting language algorithm, etc.) designed to produce wording, when combined with assessment item parameters 112 and fed the grounding knowledge 120b, that is prompt engineered for obtaining consistent, reliable results from a corresponding AI model 518 tuned for receiving unique inputs from users arranged within the constructs of the prompt template 516a.

In some implementations, the audio and/or visual content generating engine 514 combines at least a portion of the assessment item parameters 112 and at least a portion of the text passage portion 508 with the prompt template 516a along with the grounding knowledge 120b to produce input for a given AI model of one or more AI models 518. The audio and/or visual content generating engine 514, for example, may produce one or more model prompts designed to communicate a request to at least one AI model of the one or more AI models 518 based on the assessment item parameters 112, the grounding knowledge 120b, and the text passage portion 508. The audio and/or visual content generating engine 514 may supply the one or more model prompts via the prompt template 516a to one or more of the AI model(s) 518.

Responsive to the audio and/or visual content generating engine 514 providing the one or more model prompts to the one or more AI model(s) 518, in some implementations, each of the AI model(s) 518 prompted by the audio and/or visual content generating engine 514 returns an AI-generated media content item, illustrated as the media content portion 510 of the assessment stimuli item. The media content portion 510, for example, may include a graphic, video, and/or audio content. Each AI model 518, for example, may produce a different style of media content. Multiple media content types may be generated as the media content portion 510 (e.g., video with corresponding audio, an interactive series of still images, etc.). Further, the media content portion 510 may be generated in parts (e.g., each part generated by prompting either a different AI model 518 or the same AI model 518 and using a separate prompt template 516). In illustration, an audio content part may be generated separately from the still graphic content part. In some embodiments, two or more medica content portions may be generated together as a set (e.g., by a same AI model 518 according to a single prompt template 516a). For example, an audio part coordinated with a video part may be produced by a same AI model 518 based on a same media prompt template 516.

In some implementations, the audio and/or visual content generating engine 514 stores the media content portion 510 to the assessment stimuli item bank 512. The audio and/or visual content generating engine 514 may store the media content portion 510 along with metadata identifying the particular prompt template 516a and/or the particular AI model(s) 518 used to produce the media content portion 510. Further, the metadata may include a unique identifier associated with the media content portion 510.

As described above in relation to the text passage portion 508, in some implementations, the text passage portion 508 is presented in combination with the audio and/or visual portion for review and approval by an end user. Further, in some embodiments, the end user may have the option to edit the media content portion 510. The user, for example, may submit feedback that is used, by the audio and/or visual content generating engine 514, to adjust the assessment item parameters 112 and/or include additional grounding knowledge 120b to update the prompting of the AI model(s) 518. The assessment stimuli item bank 512, in some implementations, tracks metadata related to iterations of adjustments to the media content portion 510.

Figure 5B:
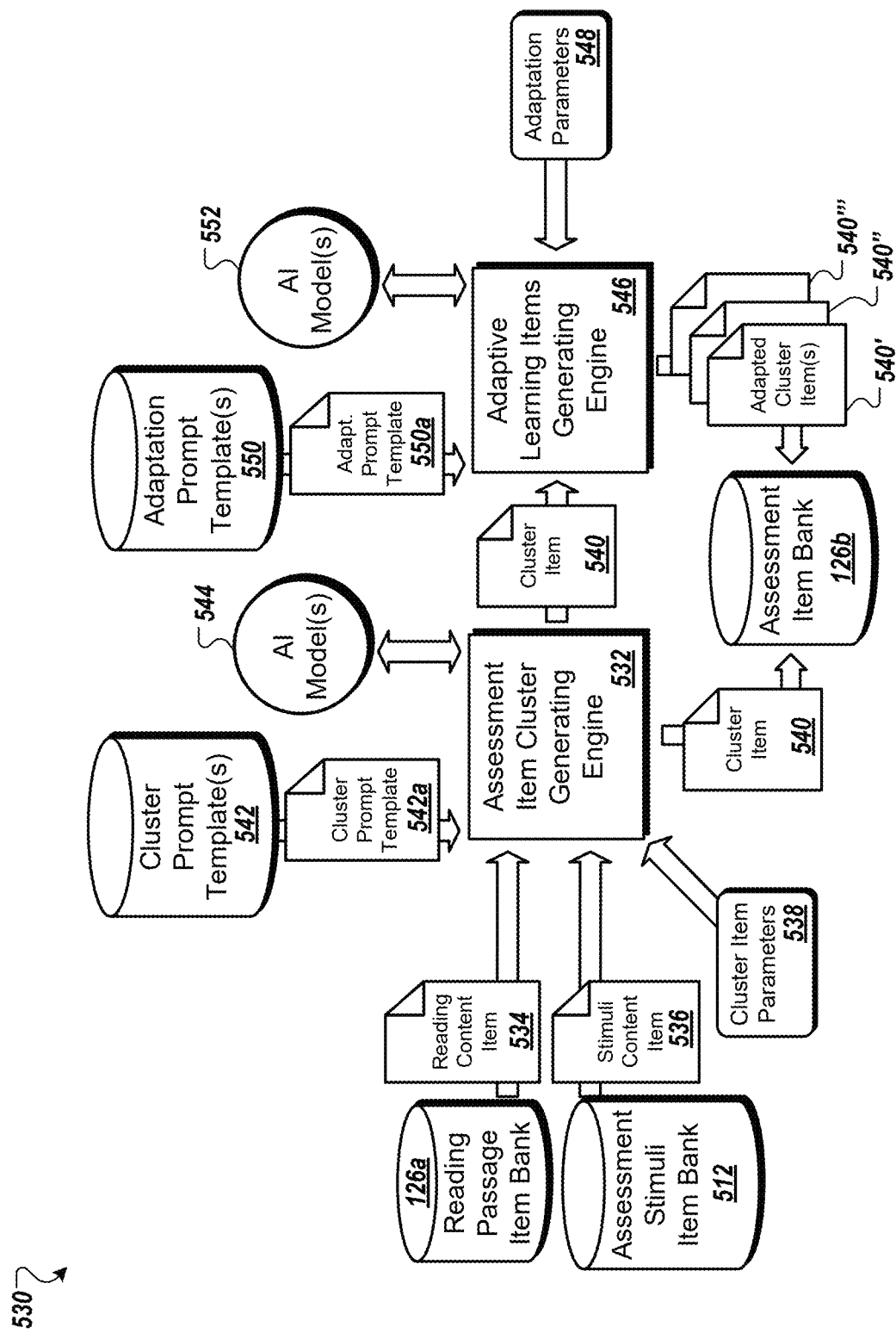

Turning to FIG. 5B, in some implementations, a flow diagram illustrates an example process flow 530 for generating cluster items from multiple content items and adaptively adjusting a learning level of content items, such as cluster items. The process flow 530, for example, may be used for presenting, to a learner, assessment questions related to a reading passage. In another example, the process flow 530 may be used for presenting, to the learner, a reading prompt and associated small essay response element with instructions for preparing the response.

In some implementations, the process 530 begins with an assessment item cluster generating engine 532 obtaining a reading content item 534 from the reading passage item bank 126a and a stimuli content item 536 from the assessment stimuli item bank 512. The assessment item cluster generating engine 532 may also obtain cluster item parameters 538 identifying, for example, factors to use in combining the reading content item 534 with the stimuli content item 536 (e.g., relative positioning, relative sizing, position of a media content item within the reading content item to break up the flow of the text, etc.).

In some implementations, the assessment item cluster generating engine 532 produces a cluster item 540 that combines the reading content item 534 and the stimuli content item 536 according to the cluster item parameters 538. The assessment item cluster generating engine 532, for example, may digitally combine the reading content item 534 with the stimuli content item 536 according to presentation rules in the cluster item parameters 538. The cluster item 540, in another example, may format the presentation rules as web instructions (e.g., scripting language, online data interchange file format such as JSON, real-time rendering instructions such as JavaScript, etc.) for digitally rendering the content of the reading content item 534 and the stimuli content item 536 as the combined cluster item 540.

The assessment item cluster generating engine 532, in some implementations, accesses a cluster prompt template 542a from a cluster prompt template data store 542. The cluster prompt template data store 542, for example, may include multiple prompt templates, each prompt template appropriate to a particular type of stimuli content item, learning level or target audience (e.g., language skill level of the end learner), and/or certain styles of layouts or presentation identified in the cluster item parameters 538. In another example, different prompt templates may be applicable to different end product types (e.g., manners in which to combine the reading content item 534 with the stimuli content item 536, as described above). The cluster prompt template 542a, for example, may be an artificial intelligence (AI) model prompt architecture (e.g., fill-in-the-blank style form, scripting language algorithm, etc.) designed to produce wording, when combined with cluster item parameters 538, the reading content item 534, and the stimuli content item 536, that is prompt engineered for obtaining consistent, reliable results from a corresponding AI model 544 tuned for receiving unique inputs from users arranged within the constructs of the prompt template 542a.

In some implementations, the assessment item cluster generating engine 532 combines at least a portion of the cluster item parameters 538 and at least a portion of the reading content item 534 and/or the stimuli content item 536 (e.g., aspects of a metadata portion of the content items 534 and/or 536) with the prompt template 542a along with the reading content item 534 and stimuli content item 536 (e.g., text and/or multimedia content portions) to produce input for a given AI model of one or more AI models 544. The assessment item cluster generating engine 532, for example, may produce one or more model prompts designed to communicate a request to at least one AI model of the one or more AI models 544 based on the cluster item parameters 538, the reading content item 534, and the stimuli content item 536. The assessment item cluster generating engine 532 may supply the one or more model prompts via the prompt template 542a to one or more of the AI model(s) 544.

Responsive to the assessment item cluster generating engine 532 providing the one or more model prompts to the one or more AI model(s) 544, in some implementations, each of the AI model(s) 544 prompted by the assessment item cluster generating engine 532 returns an AI-generated cluster item 540. The cluster item 540, for example, may include a graphic, video, and/or audio content. The cluster item 540 may include, in further examples, layout instructions and/or presentation instructions for the included assessment content (e.g., reading and stimuli content). Additionally, the cluster item 540 may include interactive content and/or instructions to generate interactive content for assisting in learners submitting information related to the assessment. Each AI model 544, for example, may produce a different style of content and/or presentation.

The cluster item 540, in some implementations, is presented to an end user for review and approval. In some embodiments, the end user may have the option to edit the cluster item 540. The user, for example, may submit feedback that is used, by the assessment item cluster generating engine 532, to adjust the cluster item parameters 538 and/or include additional grounding knowledge (e.g., such as metadata corresponding to the reading content item 534 and/or the stimuli content item 536) to update the prompting of the AI model(s) 544. The assessment item bank 126b, in some implementations, tracks metadata related to iterations of adjustments to the cluster item 540. For example, the adjustment tracking metadata may be used at a later time to inform the system of user preferences (e.g., to auto-generate a portion of the cluster item parameters 538, recommend default values of a portion of the cluster item parameters 538 to the end user, etc.).

In some implementations, the assessment item cluster generating engine 532 stores the cluster item 540 to the assessment item bank 126b. The assessment item cluster generating engine 532 may store the cluster item 540, for example, along with metadata identifying the particular prompt template 542a and/or the particular AI model(s) 544 used to produce the cluster item 540. Further, the metadata may include a unique identifier associated with the cluster item 540.

In some implementations, an adaptive learning items generating engine 546 is configured to adjust preexisting assessment items, such as the cluster item 540, to additional learning levels. The adjustments, for example, may be guided by adaptation parameters 548 submitted by an end user. For example, the reading content item 534 included in the cluster item 540 may be adjusted in grammar and/or style either upwards (e.g., increasing sophistication for a higher learning level) or lower (e.g., decreasing sophistication for a lower learning level). Further, assessment queries (e.g., multiple choice questions, fill-in-the-blank, short essay prompts, etc.) included in the stimuli content item 536 of the cluster item 540 may be adjusted for a deeper level of insight (e.g., corresponding to a higher learning level) or a simpler level of insight (e.g., corresponding to a lower learning level). The learning levels discussed above do not necessarily correspond to a full grade level or other "promotion" in aptitude. Instead, the differentiations prepared by the adaptive learning items generating engine 546 may account for students within a same class or grade level who struggle versus students within the same class or grade level who have demonstrated preexisting knowledge and/or an increased aptitude toward the particular learning content. In this manner, a teacher may generate an arsenal of cluster items appropriate to varying levels of learners approaching a same topic.

In some implementations, the adaptive learning items generating engine 546 accesses an adaptation prompt template 550a from an adaptation prompt template data store 550. The adaptation prompt template data store 550, for example, may include multiple prompt templates, each prompt template appropriate to a particular type of assessment item (e.g., simple assessment item, cluster assessment item, etc.), learning level adjustment (e.g., up, down, etc.), and/or target audience (e.g., language skill level of the end learner, special needs of the end user such as, in some examples, English as a second language, dyslexia, color blindness, etc.). The cluster prompt template 550a, for example, may be an artificial intelligence (AI) model prompt architecture (e.g., fill-in-the-blank style form, scripting language algorithm, etc.) designed to produce wording, when combined with the adaptation parameters 548 and the assessment item (e.g., cluster item 540), that is prompt engineered for obtaining consistent, reliable results from a corresponding AI model 552 tuned for receiving unique inputs from users arranged within the constructs of the adaptation prompt template 550a.

In some implementations, the adaptive learning items generating engine 546 combines at least a portion of the adaptation parameters 548 and at least a portion of the assessment item (e.g., the cluster item 540) with the prompt template 550a along with the assessment item (e.g., cluster item 540) to produce input for a given AI model of one or more AI models 550. The adaptive learning items generating engine 546, for example, may produce one or more model prompts designed to communicate a request to at least one AI model of the one or more AI models 550 based on the adaptation parameters 548 and the topic assessment item (e.g., cluster item 540). The adaptive learning items generating engine 546 may supply the one or more model prompts via the prompt template 550a to one or more of the AI model(s) 552.

Responsive to the adaptive learning items generating engine 546 providing the one or more model prompts to the one or more AI model(s) 550, in some implementations, each of the AI model(s) 550 prompted by the adaptive learning items generating engine 546 returns an AI-generated adapted assessment item, such as the adapted cluster items 540', 540'', and 540'''. The adapted assessment items, for example, may include the same graphic, video, and/or audio content with adapted text content. In another example, aspects of the graphic, video, and/or audio content that may have existed in the original assessment item may be adjusted (e.g., graph labels, complexity of graph, complexity of language in the audio portion, etc.) for the different learning level. Further, in some embodiments, aspects of the original assessment item may be converted from one form of content to another. For example, to support an early reader or ESL student, audio content may replace or augment a portion of the text content of an original assessment item. Each AI model 552, for example, may produce a different style of content and/or presentation appropriate for the adapted learning level.

The adapted assessment item(s) (e.g., cluster item 540' 540", and/or 540'''), in some implementations, are presented to an end user for review and approval. In some embodiments, the end user may have the option to edit the adapted assessment item(s). The user, for example, may submit feedback that is used, by the adaptive learning items generating engine 546, to adjust the adaptation parameters 548 and/or include additional grounding knowledge (e.g., such as grounding knowledge for converting content from one format to another) to update the prompting of the AI model(s) 552. The assessment item bank 126*b*, in some implementations, tracks metadata related to iterations of adjustments to the adapted assessment items. For example, the adjustment tracking metadata may be used at a later time to inform the system of user preferences (e.g., to auto-generate a portion of the adaptation parameters 548, recommend default values of a portion of the adaptation parameters 548 to the end user, etc.).

In some implementations, the adaptive learning items generating engine 546 stores the adapted assessment item(s) (e.g., cluster item 540', 540", and 540''') to the assessment item bank 126*b*. The adaptive learning items generating engine 546 may store the adapted assessment item(s), for example, along with metadata identifying the particular prompt template 550*a* and/or the particular AI model(s) 552 used to produce each of the adapted assessment item(s). Further, the metadata may include a unique identifier associated with each adapted assessment item.

Figure 6:
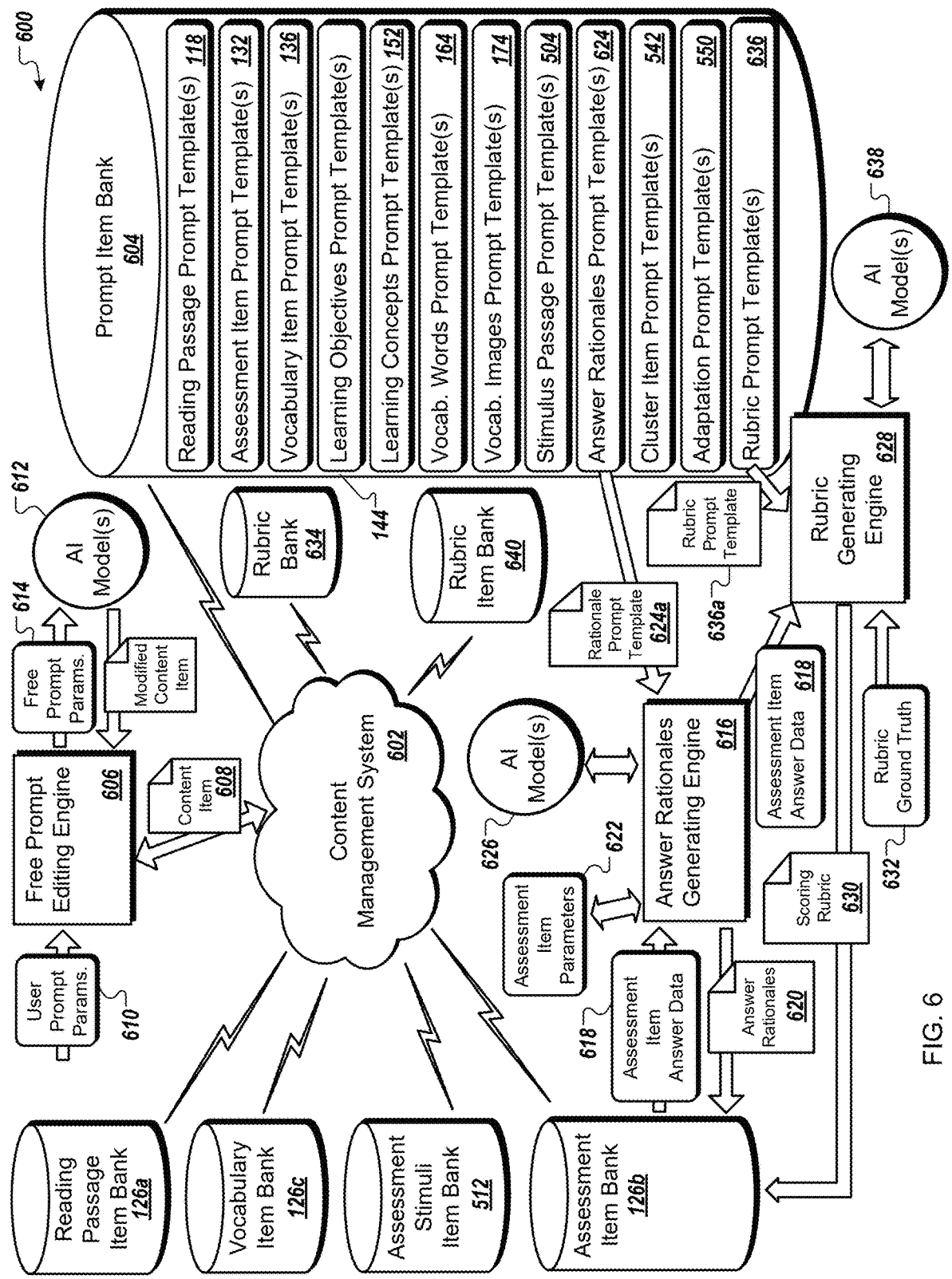
FIG. 6 illustrates a flow diagram of an example system for updating content items and creating answer analysis content related to content items.

Turning to FIG. 6, a block diagram illustrates a content management system 602 and architecture 600 for generating, organizing, adjusting, augmenting, and sharing content items created using various prompt templates available from a prompt item bank 604. The content management system 602, for example, may manage access by users to content items stored in various content item banks such as the reading passage item bank 126*a*, the assessment item bank 126*b*, the vocabulary item bank 126*c*, and/or the assessment stimuli item bank 512. Further, the content management system 602 may manage the storage of and access to various prompt templates of the prompt item bank 604, such as the reading passage prompt templates 118, the assessment item prompt templates 132, the vocabulary item prompt templates 136, the learning objectives prompt templates 144, the learning concepts prompt templates 152, the vocabulary words prompt templates 164, the vocabulary images prompt templates 174, the stimulus passage prompt templates 504, the cluster prompt templates 542, and/or the adaptation prompt templates 550. Various content generating engines, such as the reading passage item generating engine 116, the assessment item generating engine 128, and/or the vocabulary item generating engine 134 of FIG. 1A, the learning objectives generating engine 142 and/or the learning concepts generating engine 150 of FIG. 1B, the vocabulary words generating engine 162, the vocabulary word image generating engine 172, and/or the vocabulary assessment item generating engine 180 of FIG. 1C, the stimulus passage generating engine 502 and/or the audio and/or visual content generating engine 514 of FIG. 5A, and/or the assessment item cluster generating engine 532 and/or the adaptive learning items generating engine 546 of FIG. 5B may access the content management system 602 to access, adjust, and/or store content items to the content item banks 126*a*, 126*b*, 126*c*, and/or 512.

In some implementations, a free prompt editing engine 606 provides an end user, such as a user having a higher skill or qualification level, access to adjusting a selected content item 608 (e.g., obtained from one of the item banks 126*a*, 126*b*, 126*c*, or 512) without submitting information via one of the prompt templates of the prompt item bank 604. The free prompt editing engine 606, for example, may accept freeform user prompt parameters 610 and adapt the user prompt parameters 610 for submission to one or more AI models 612 as open prompt parameters 614, along with a copy of the content item 608 (e.g., at least a content portion, such as text, audio, graphic(s), and/or video, in the circumstance the content item 608 also includes metadata as discussed above). The free prompt editing engine 606, for example, may act as a wrapper for access to one or more generative AI models created or tuned for modifying content items. The free prompt editing engine 606, in some embodiments, reviews and approves the user prompt parameters 610 prior to submission to an AI model. The free prompt editing engine 606, for example, may review the user prompt parameters 610 for clarity and consistency with terminology used in producing changes to content items. For example, the free prompt editing engine 606 may modify one or more terms to increase clarity. In another example, the free prompt editing engine 606 may evaluate the user prompt parameters 610 to identify potentially malicious text or other undesirable content. In some embodiments, the free prompt editing engine 606 combines the user prompt parameters 610 with additional information and/or metadata regarding the content item 608 to further ensure consistency of results based on the user prompt parameters 610. The free prompt editing engine 606, for example, may add the user prompt parameters 610 to a free prompt template.

In some implementations, an answer rationales generating engine 616 obtains assessment item answer data 618 associated with one of the assessment items generated, for example, by the assessment item generating engine 128, the assessment item cluster generating engine 532, and/or the adaptive learning items generating engine 546 (e.g., stored to the assessment item bank 126*b*) and generates a set of answer rationales 620 explaining why correct answers are correct and wrong answers are wrong. The answer rationales generating engine 616 may obtain assessment item parameters 622 (e.g., at least a portion of the assessment item parameters 112 of FIG. 1A and/or a portion of the metadata corresponding to the content item including the assessment item answer data 618) for producing answer rationales directed to the target set of learners (e.g., a particular learning level, grade level, etc.).

The answer rationales generating engine 616, in some implementations, accesses a rationale prompt template 624*a* from a rationale prompt template data store 624. The rationale prompt template data store 624, for example, may include multiple prompt templates, each prompt template appropriate to a particular type of assessment item (e.g., multiple choice, fill-in-the-blank, short answer, short essay, etc.), learning level or target audience (e.g., language skill level of the end learner, whether the rationale is provided directly to the learner or to a teacher/learning assistant (e.g., parent, daycare provider, etc.) working with the learner), and/or certain styles of layouts or presentation identified in the assessment item parameters 622. In another example, different prompt templates may be applicable to different end product types (e.g., manners in which to present the answer rationales in relation to the learner's answers). For example, answer rationales may be presented in real-time (e.g., in-line with learner answers upon submission of the answers, hover-over the answer upon submission of the answers, etc.) or in a separate interface (e.g., an automated grading result report provided to the learner and/or teacher/learning assistant). The answer rationales prompt template 624a, for example, may be an artificial intelligence (AI) model prompt architecture (e.g., fill-in-the-blank style form, scripting language algorithm, etc.) designed to produce wording, when combined with assessment item parameters 622, the assessment item answer data 618, and any further grounding knowledge (e.g., metadata or content of the assessment item itself), that is prompt engineered for obtaining consistent, reliable results from a corresponding AI model 626 tuned for receiving unique inputs from users arranged within the constructs of the rationale prompt template 624a.

In some implementations, the answer rationales generating engine 616 combines at least a portion of the assessment item parameters 622 and at least a portion of the assessment item answer data 618 with the prompt template 624a to produce input for a given AI model of one or more AI models 626. The answer rationales generating engine 616, for example, may produce one or more model prompts designed to communicate a request to at least one AI model of the one or more AI models 626 based on the assessment item parameters 622 and the assessment item answer data 618. The answer rationales generating engine 616 may supply the one or more model prompts via the prompt template 624a to one or more of the AI model(s) 624.

Responsive to the answer rationales generating engine 616 providing the one or more model prompts to the one or more AI model(s) 626, in some implementations, each of the AI model(s) 626 prompted by the answer rationales generating engine 616 returns one or more AI-generated answer rationale(s) 620. The answer rationales 620, for example, may include text, graphic, audio, and/or video content. In illustration, the answer rationales 620 for a language learning module may provide a correct pronunciation of a foreign language word/term/phrase as audio content. In another illustrative example, the answer rationales 620 for an assessment stimuli content item may provide an animated overlay on a graph or diagram pointing to aspects related to a particular answer rationale. The answer rationales 620 may include, in further examples, layout instructions and/or presentation instructions for presenting the answer rationales 620 to the end user (e.g., learner and/or teacher/teaching assistant). Each AI model 626, for example, may produce a different style of content and/or presentation.

The answer rationales 620, in some implementations, are presented to an end user for review and approval. In some embodiments, the end user may have the option to edit the answer rationales 620. The user, for example, may submit feedback that is used, by the answer rationales generating engine 616, to adjust the assessment item parameters 622 and/or include additional grounding knowledge (e.g., such as metadata corresponding to the assessment item) to update the prompting of the AI model(s) 626. The assessment item bank 126b, in some implementations, tracks metadata related to iterations of adjustments to the answer rationales 620. For example, the adjustment tracking metadata may be used at a later time to inform the system of user preferences (e.g., to auto-generate a portion of the assessment item parameters 622, recommend default values of a portion of the assessment item parameters 622 to the end user, etc.).

In some implementations, the answer rationales generating engine 616 stores the answer rationales 620 to the assessment item bank 126b. The answer rationales generating engine 616 may store the answer rationales 620, in correspondence with the assessment item answer data 618 and/or other information for the assessment content item. The answer rationales generating engine 616, in another example, may store metadata identifying the particular prompt template 624a and/or the particular AI model(s) 626 used to produce the answer rationales 620. Further, the metadata may include a unique identifier associated with the answer rationales 620.

Although illustrated as being captured from the assessment item answer bank 126b, in other embodiments, the answer rationales generating engine 616 may be executed concurrently with and/or after the assessment item generating engine 128 to produce both the content item 130b of FIG. 1A as well as its associated answer rationales 620.

The content management system 602, in some implementations, is accessed by a rubric generating engine 628 configured to produce scoring rubrics 630 based on user input parameters. The scoring rubrics 630, for example, may each be applicable to one or more types of content items (e.g., assessment items of the assessment item bank 126b, assessment stimuli items of the assessment stimuli item bank 126b, reading passage items of the reading passage item bank 126a, etc.). The rubric generating engine 628, for example, may access rubric ground truth 632 from a rubric bank 634 applicable to the assessment item answer data 618. The rubric ground truth 632, for example, may be applicable to the type of answers (e.g., multiple choice, fill-in-the-blank, matching, etc.), the learning level, a target teacher or learning organization, a learning topic, and/or a learning standards structure (e.g., an American learning standards skill structure, an international learning standards skill structure, a Canadian learning standards skill structure, etc.). The rubric ground truth 632, for example, may define aspects of a grading or scoring rubric such as, in some examples, a reading fluency rubric, a reading comprehension rubric, a written response rubric, an argumentative writing rubric, or an essay rubric. The rubric, for example, may include scoring criteria and a scoring scale corresponding to aspects of the criteria demonstrated in a learner's answer. While described in relation to a particular content item, in other embodiments, the rubric generating engine 628 is configured to generate a rubric based solely on user-provided rubric parameters. For example, the rubric parameters may relate to grading a writing assignment described in relation to assignment parameters.

In some implementations, the rubric generating engine 628 analyzes the rubric ground truth 632 to produce the scoring rubric 630 applicable based on the particular assessment content item (e.g., for reviewing answers corresponding to the assessment item answer data 618). The scoring rubric 630, for example, may be distributed to all manual reviewers analyzing answers provided by learners via the content item to ensure consistent scoring standards across the learners. In another example, the scoring rubric 630 may be used in automatically scoring student answers, for example using a scoring calculator algorithm, machine learning, and/or artificial intelligence analysis. The type of automated scoring, for example, may be based in part on a type of content item. For a simple content item, such as multiple choice, scoring may be a straightforward calculation performed by an algorithm, while a short essay question may be better automatically reviewed using artificial intelligence.

The rubric generating engine 628, in some implementations, accesses a rubric prompt template 636a from a rubric prompt template data store 636. The rubric prompt template data store 636, for example, may include multiple prompt templates, each prompt template appropriate to a particular type of rubric ground truth 632, an assessment item level or target audience (e.g., language skill level of the end learner), and/or the end use of the scoring rubric 630 (e.g., automated scoring, manual scoring, or a mix of both). The rubric prompt template 636, for example, may be an artificial intelligence (AI) model prompt architecture (e.g., fill-in-the-blank style form, scripting language algorithm, etc.) designed to produce wording, when combined with assessment item parameters such as the assessment item answer data 618 and fed the rubric ground truth 632 that is prompt engineered for obtaining consistent, reliable results from a corresponding AI model 638 tuned for receiving unique inputs from users arranged within the constructs of the prompt template 636a.

In some implementations, the rubric generating engine 628 combines the assessment item parameters (e.g., assessment item answer data 618 or aspects thereof, additional assessment item parameters, etc.) with the prompt template 636a and the rubric ground truth 632 to produce input for a given AI model of one or more AI models 638. The rubric generating engine 628, for example, may produce one or more model prompts designed to communicate a request to at least one AI model of the one or more AI models 638 based on the assessment item parameters and rubric ground truth 632. The rubric generating engine 628 may supply the one or more model prompts via the prompt template 636a to one or more of the AI model(s) 638.

Responsive to the rubric generating engine 628 providing the one or more model prompts to the one or more AI model(s) 638, in some implementations, each of the AI model(s) 638 prompted by the rubric generating engine 628 returns an AI-generated scoring rubric 630 or portion thereof (e.g., scoring related to a particular aspect or category of review). The scoring rubric 630, in some examples, may include text for instructing educators on the parameters for conducting manual review, machine-readable code or instructions for use in performing automated review, and/or a mapping of answer value-to-score (e.g., for use in analyzing answer selections as opposed to freeform answers).

In some implementations, the rubric generating engine 628 stores the scoring rubric 630 to the assessment item bank 126b and/or to a rubric item bank 640. When stored in relation to a content item such as the assessment item having the assessment item answer data 618, for example, the rubric generating engine 628 may store the scoring rubric 630 along with metadata identifying the content item, the parameters passed to the rubric generating engine 628 (e.g., the assessment item answer data 618), the rubric ground truth 632, the particular prompt template 636a, and/or the particular AI model(s) 638 used to produce the scoring rubric 630. Further, the metadata may include a date and/or timestamp, a unique identifier associated with the scoring rubric 630, identification of an end user who provided the request for scoring rubric generation (e.g., as part of the assessment item generation, as part of the answer rationales generation, or separately), and/or identification of a design team and/or educational organization associated with generation of the scoring rubric 630 (e.g., a group ownership). In another example, the metadata may include a designation of a base scoring or grading rubric architecture and/or a learning standards skill structure applicable to the scoring rubric 630. If the scoring rubric 630 is instead stored to the rubric item bank 640, a link to the scoring rubric 630 (and, in correspondence, any metadata stored in association therewith) may be added to any corresponding content items (e.g., in the reading passage item bank 126a, the vocabulary item bank 126c, the assessment stimuli item bank 512, and/or the assessment item bank 126b).

The scoring rubric 630, in some implementations, is presented to an end user for review and approval. Further, in some embodiments, the end user may have the option to edit the scoring rubric 630. The user, for example, may submit feedback that is used, by the rubric generating engine 628, to adjust the assessment item parameters and/or include additional rubric ground truth from the rubric bank 634 to update the prompting of the AI model(s) 638. The assessment item bank 126b, in some implementations, tracks metadata related to iterations of adjustments to the scoring rubric 630. For example, the adjustment tracking metadata may be used at a later time to inform the system of user preferences (e.g., to auto-generate a portion of the assessment item parameters, recommend default values of a portion of the assessment item parameters to the end user, etc.).

Figure 7A:
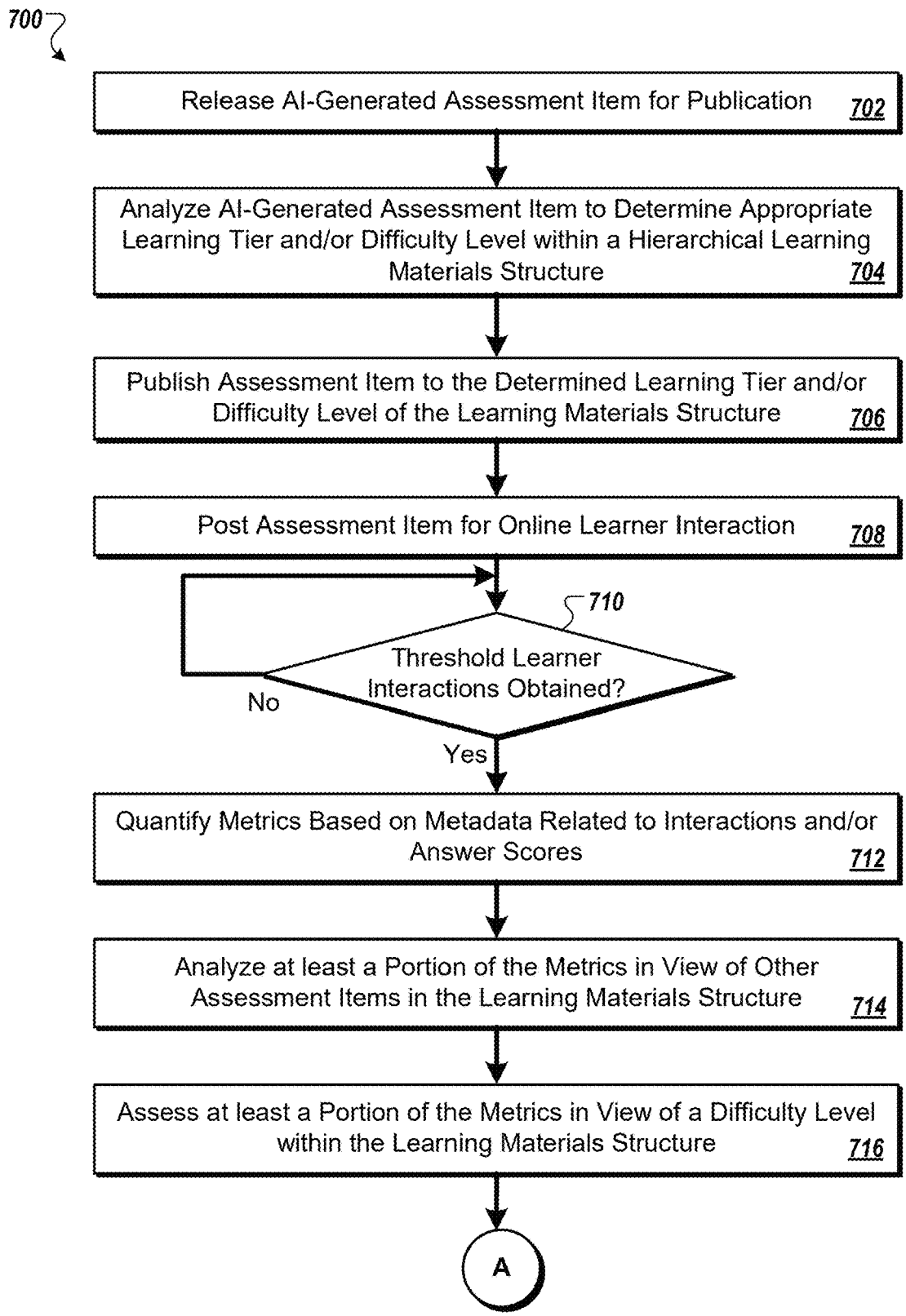
FIG. 7 illustrates a flow chart of an example method for automatically reviewing performance of AI-generated content items after release in an online learning environment.
Figure 7B:
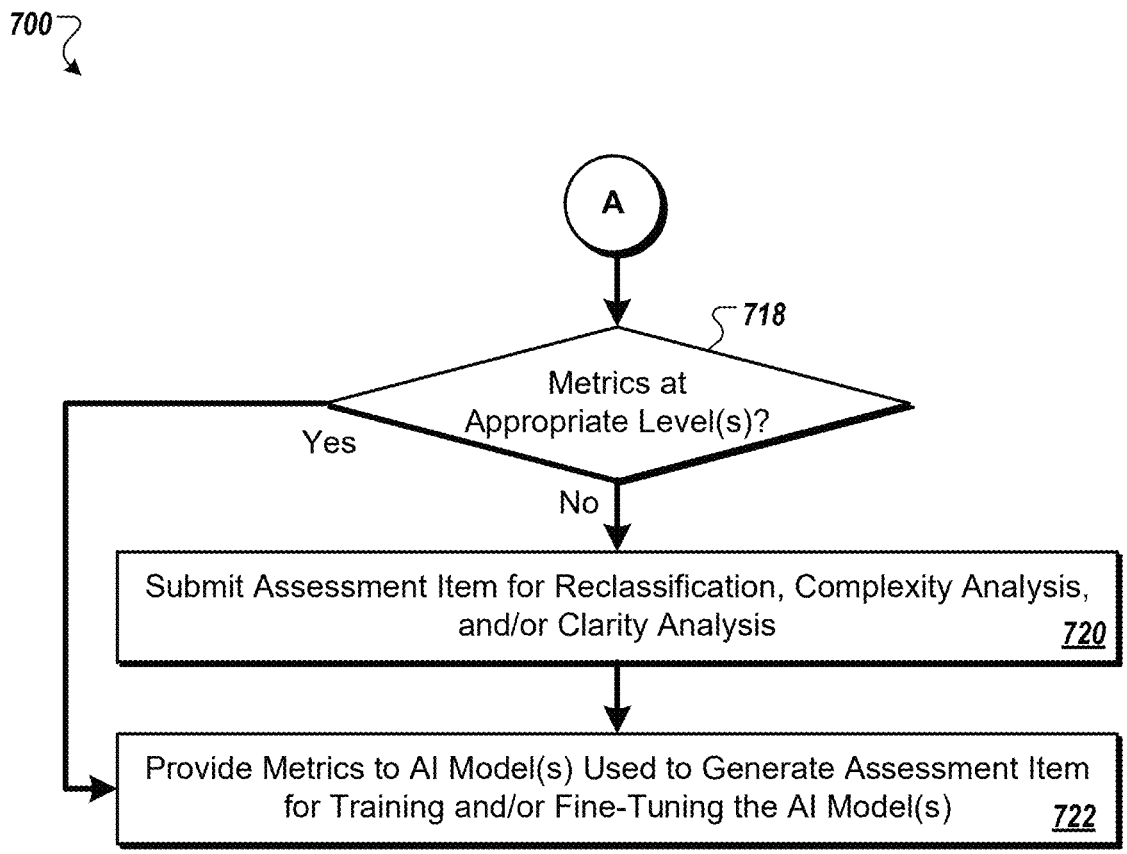

FIG. 7A and FIG. 7B illustrate a flow chart of an example method 700 for automatically reviewing performance of AI-generated content items after release in an online learning environment. The method 700, for example, may be performed on assessment items, assessment stimuli items, and/or assessment cluster items stored to the assessment item bank 126 and/or the assessment stimuli item bank 512, as discussed in relation to FIG. 1A, FIG. 5A, and FIG. 5B.

In some implementations, the method 700 begins with releasing an artificial intelligence (AI)-generated assessment item for publication (702). The AI-generated assessment item, for example, may be released by saving as a completed item to the assessment item bank 126 of FIG. 1A and/or the assessment stimuli item bank 512 of FIG. 5A. Release of the AI-generated assessment item may render the assessment item publicly accessible and/or accessible based on user permissions (e.g., accessible within a team, organization, etc.). In one example, releasing the AI-generated assessment item for publication places the AI-generated assessment item in a queue for insertion into a content hierarchy provided for online access to a pool of learners.

In some implementations, the AI-generated assessment item is analyzed to determine an appropriate learning tier (e.g., level of proficiency) and/or difficulty level for positioning the AI-generated assessment item within a hierarchical learning materials structure (704). For example, a psychometric assessment may be automatically performed on the learning objectives 148 of FIG. 1B, the learning concepts 156 of FIG. 1B, the answer rationales 620 of FIG. 6 and/or the scoring rubric 630 of FIG. 6, to determine the proper positioning within the hierarchical learning materials structure. A knowledge rating obtained at least in part through psychometric analysis, for example, may be used to insert the AI-generated assessment item within the hierarchical learning materials structure. In some embodiments, a user may manually review and approve the proposed position within the hierarchical learning materials structure.

In some implementations, the assessment item is published to the determined learning tier and/or difficulty level of the learning materials structure (706). Metadata related to the assessment item such as, in some examples, a subject area, topic(s), sub-topic(s), language, grade level, learning standard, age, or age range may be applied to determine a particular position in view of the learning tier and/or difficulty level. The learning tier, for example, may be based at least in part on whether the assessment item was adjusted in difficulty level as described in relation to the adaptive learning items generating engine 546 of FIG. 5B.

In some implementations, the AI-generated assessment item is posted for online learning interactions (708). For example, the assessment item may be included in a body of content items accessible to online learners via an online portal, web page, and/or smart device app. Posting the assessment item may include storing the assessment item in a database queried by a web-based learning system, tagging the assessment item for accessibility based on an online submitted request (e.g., subject, topic, learning level, etc.), and/or incorporating the assessment item into an online lesson plan.

In some implementations, once threshold learner interactions with the assessment item have been obtained (710), metrics are quantified based on metadata related to the learner interactions and/or answer scores derived from the learner interactions (712). The metrics may be designed to objectively evaluate a difficulty level of the assessment item and/or a level of uncertainty a learner demonstrates when interacting with the assessment item. The metrics, in some examples, may quantify one or more lengths of time of engagement (e.g., time to answer individual questions, time to complete a task, etc.), a number of false moves (e.g., inaccurate interactions with the assessment item), an average score, and/or score distributions.

In some implementations, certain metrics are analyzed in view of other assessment items in the learning materials structure (714). For example, the lengths of times of interactions, number of false moves, and/or average scores may be compared to the typical assessment item for the same or similar subject, topic, learning level, and/or difficulty level to determine whether the assessment item was appropriately classified in view of the level of anticipated sophistication of the learners being presented with the assessment item.

In some implementations, certain metrics are assessed in view of a difficulty level of the assessment item within the learning materials structure (716). For example, the average score or score distributions may be compared to a target average score or score distribution for the position of the assessment item within the learning materials structure.

Turning to FIG. 7B, in some implementations, if it is determined that one or more of the metrics is not at an appropriate level (718), the assessment item is submitted for reclassification, complexity analysis, and/or clarity analysis (720). The treatment of the assessment item may vary based upon a number of factors. For example, with certain target learning groups, such as young learners, a higher level of scoring may be desirable to increase students' confidence levels. In this circumstance, the assessment item may be submitted for complexity analysis so that it can be reworked to be more appropriate for the target audience. The complexity analysis may be semi-automated, for example by having a user in the loop for approval of modifications made to the assessment item by one or more AI models. In another example, if certain metrics point to a clarity problem (e.g., the students are confused by the instructions, similarity of two answer options, etc.), the assessment item may be submitted for semi-automated analysis to increase clarity by replacing the suspected area of confusion, such as the instructions or the overly similar answer options. In a further example, if the difficulty level does not appear to comport with the assigned difficulty level, the assessment item may simply be reclassified to align the actual difficulty level with the labeled difficulty level (e.g., easier or harder based upon the outcome of the answer score analysis (714) and/or assessment (716). In other embodiments, the assessment item may be submitted for manual reclassification, complexity analysis, and/or clarity analysis.

In some implementations, whether or not the metrics were determined to be at the appropriate level (718), the metrics are provided to one or more AI models used to generate the assessment item for training and/or fine-tuning the AI model(s) (722). The feedback, in some examples, may be used to refine the AI models and/or the assessment parameters used for populating the prompt templates. For example, certain assessment parameters may be added, removed, emphasized (e.g., weighted), de-emphasized, expanded (e.g., into a greater scale of potential values) and/or contracted (e.g., into a briefer scale of potential values. The modifications of assessment parameters, for example, may be designed to improve the ability to discriminate between ability levels.

Although the method 700 is described as including a particular set of operations, in other embodiments, the method 700 may include more or fewer operations. For example, in addition to assessing the metrics (716), metadata quantifying other interactions, such as reuse of a particular content item by peers (e.g., through modification of a content item stored to the reading passage item bank 126a, the assessment item bank 126b, the vocabulary item bank 126c, or assessment stimuli item bank 512, for example using the free prompt editing engine 606 of FIG. 6), positive or negative indications associated with a content item (e.g., "likes" or "dislikes" from content developers and/or learners), and/or propensity of students to select a particular content item may be included in the assessment.

Although described in relation to a particular set of operations, in other embodiments, the method 700 includes more or fewer operations. For example, if manual review is used when analyzing the AI-generated assessment item to determine the appropriate learning tier and/or difficulty level for positioning the AI-generated assessment item within the hierarchical learning materials structure (704), any manual adjustment made to the positioning may be fed back to fine tune a model for psychometrically identifying the position of AI-generated assessment items within the hierarchical learning materials structure. Although the method 700 includes a particular series of operations, in other embodiments, certain operations may be performed in a different order and/or concurrently. For example, publishing the assessment item (706) may involve posting the assessment item (708). In another example, the metrics may be assessed (716) prior to or concurrently with being analyzed (714). Other modifications are possible.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the computing device to perform, in some examples, the process 100 of FIG. 1A, the process 140 of FIG. 1B, the process 160 of FIG. 1C, the method 300 of FIG. 3A and FIG. 3B, the process 500 of FIG. 5A, the process 530 of FIG. 5B, the process 600 of FIG. 6, and/or the method 700 of FIG. 7A and FIG. 7B.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi®, Bluetooth®, Zigbee®, or another wireless form of communication. The network, for example, may support communications between The content management system 602 and computing devices of users engaging with one of its engines, such as the free prompt editing engine 606. Further, the network may support communications between the content management system 602 and various storage devices, such as the storage media storing the prompt item bank 604, the rubric bank 634, the reading passage item bank 126a, the assessment item bank 126b, the vocabulary item bank 126c, and/or the assessment stimuli item bank 512.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display. The display controller and display may enable presentation of the screen shots illustrated, in some examples, in FIG. 4A through FIG. 4E.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™ or Amazon™ Web Services (AWS™), may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google™ Cloud Storage or Amazon™ Elastic File System (EFS™), may store processed and unprocessed data supplied by systems described herein. For example, as illustrated in FIG. 6, the prompt item bank 604, the rubric bank 634, the reading passage item bank 126a, the assessment item bank 126b, the vocabulary item bank 126c, and/or the assessment stimuli item bank 512 may be maintained in a database structure.

The systems described herein may communicate with the cloud computing environment through a secure gateway. In some implementations, the secure gateway includes a database querying interface, such as the Google BigQuery™ platform or Amazon RDS™. The data querying interface, for example, may support access by various engines of the content management system 602 to contents of various item banks.

The systems described herein may include one or more artificial intelligence (AI) networks (e.g., neural networks) for natural language processing (NLP) of text inputs. The AI networks, in some examples, can include a synaptic neural network, a deep neural network, a transformer neural network, and/or a generative adversarial network (GAN). The AI networks may be trained using one or more machine learning techniques and/or classifiers such as, in some examples, anomaly detection, clustering, and/or supervised and/or association. In one example, the AI networks may be developed and/or based on a bidirectional encoder representations for transformers (BERT) model by Google of Mountain View, CA.

The systems described herein may communicate with one or more foundational model systems (e.g., artificial intelligence neural networks). The foundational model system(s), in some examples, may be developed, trained, tuned, finetuned, and/or prompt engineered to Execute portions of the process 100 of FIG. 1A, the process 140 of FIG. 1B, the process 160 of FIG. 1C, the process 500 of FIG. 5A, the process 530 of FIG. 5B, and/or the process 600 of FIG. 6, for example as described in relation to their various AI models. The foundational model systems, in some examples, may include or be based off of the generative pre-trained transformer (GPT) models available via the OpenAI platform by OpenAI of San Francisco, CA (e.g., GPT-3, GPT-3.5, and/or GPT-4) and/or the generative AI models available through Azure OpenAI or Vertex AI by Google of Mountain View, CA (e.g., PaLM 2). Multiple foundational model systems may be applied based on audience (e.g., student, teacher, level of student, learning topic, evaluation rubric, etc.). In another example, a single foundational model system may be dynamically adapted based on user demographic and/or topic context. In illustration, a single large language model (LLM) for use in content item generation may be queried using differing engineered prompts specific to the model type, for instance a multimodal versus text versus chat model type. (e.g., based on the type of content item, demographic and/or topic context, etc.).

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for artificial intelligence (AI)-assisted content generation via an online content management platform, the system comprising:
 a non-transitory computer-readable medium storing a plurality of prompt templates configured for progressively building content items for an online learning platform during a guided, customized content generation session, wherein
  each respective prompt template is configured for completion as an AI model prompt, and
  each respective prompt template is configured to be used, when combined with a respective set of customized values as the AI model prompt, for requesting generation, from at least one AI model, of a respective type of information used in generating the new content item; and
 one or more processors configured to perform operations comprising
  presenting, to an end user at a user computing device, a first interactive user interface comprising a first plurality of interactive controls, wherein
   each interactive control of a portion of the first plurality of interactive controls is configured to obtain, via a respective first user interaction of a set of first user interactions, selection of a respective learning objective parameter of a set of learning objective parameters associated with a new content item,
  responsive to receiving, from the end user via the first interactive user interface, selection of the set of learning objective parameters, combining the set of learning objective parameters with a learning objectives prompt template of the plurality of prompt templates to create a learning objectives AI model prompt,
  obtaining, responsive to prompting a first AI model of the at least one AI model using the learning objectives AI model prompt and grounding knowledge associated with a current content generation session initiated by the end user, a plurality of learning objectives,
  presenting, to the end user at the user computing device, a second interactive user interface comprising a second at least one interactive control for enabling selection of at least one learning objective of the plurality of learning objectives,
  responsive to receiving, from the end user via the second interactive user interface, selection of the at least one learning objective, combining the at least one learning objective with a learning concepts prompt template of the plurality of prompt templates to create a learning concepts AI model prompt,
  obtaining, responsive to prompting a second AI model of the at least one AI model using the learning concepts AI model prompt and the grounding knowledge, at least one learning concept,
  presenting, to the end user at the user computing device, a third interactive user interface comprising at least one third interactive control for approving one or more learning concepts of the at least one learning concept, after receiving, from the end user via the third interactive user interface, approval of a first learning concept of the at least one learning concept, presenting, to the end user at the user computing device, a fourth interactive user interface comprising a fourth at least one interactive control for selecting a target content item type of a plurality of content item types, responsive to receiving, from the end user via the fourth interactive user interface, selection of the target content item type, selecting, from the non-transitory computer-readable medium based at least in part on the target content item type, a selected content item prompt template of the plurality of prompt templates, combining the set of learning objective parameters, the at least one learning objective, and the first learning concept with the selected content item prompt template to produce a content item model prompt, providing, to a third AI model of the at least one AI model, the content item model prompt and the grounding knowledge, obtaining, responsive to providing the content item model prompt and the grounding knowledge, the new content item generated in accordance with the plurality of learning objective parameter values, and presenting, at a graphical user interface rendered at to the end user at the user computing device, a fifth interactive user interface comprising at least one fifth interactive control for approving the new content item.

2. The system of claim 1, wherein the set of learning objective parameters comprises at least one of a grade level, a learning standards framework, an age, or an age range.

3. The system of claim 1, wherein the plurality of content item types comprises an assessment item type, a reading item type, and a vocabulary item type.

4. The system of claim 3, wherein the assessment item type comprises a plurality of sub-types, the plurality of sub-types comprising a multiple-choice format and a fill-in-the-blank format.

5. The system of claim 1, wherein the operations further comprise:
  receiving, responsive to presenting the fifth interactive user interface, approval of the new content item; and
  storing the one or more content items to a content item bank for future presentation to learners interacting with the online learning platform.

6. The system of claim 5, wherein storing the one or more content items comprises storing, in correspondence with each respective content item of the one or more content items, the set of learning objective parameters, the at least one learning objective, the first learning concept, and the grounding knowledge used in generating the respective content item.

7. The system of claim 1, wherein:
  the content item type is an assessment type; and
  the content item comprises a set of questions and a coordinating set of answers.

8. The system of claim 7, wherein the operations comprise automatically generating, based on the set of questions and the coordinating set of answers, a set of answer rationales comprising a respective explanation associated with each correct answer and each potential wrong answer for each question of the set of questions.

9. The system of claim 8, wherein automatically generating the set of answer rationales comprises:
  selecting, based at least in part on one or more learning objective parameters of the set of learning objective parameters, a rationale prompt template of the plurality of prompt templates;
  combining the one or more learning objective parameters with the rationale prompt template to produce a rationale model prompt;
  providing, to a fourth AI model of the at least one AI model, the rationale model prompt, the set of questions, and the coordinating set of answers; and
  obtaining, responsive to providing the rationale model prompt, the set of answer rationales.

10. The system of claim 1, wherein another interactive control of the first plurality of interactive controls is configured to obtain, via another respective first user interaction of the set of first user interactions, indication of the grounding knowledge.

11. The system of claim 10, further comprising:
  a non-transitory computer-readable data store comprising a collection of grounding knowledge arranged by subject and/or topic;
  wherein receiving the indication of grounding knowledge comprises receiving a selected topic of a plurality of topics and/or a selected subject of a plurality of subjects.

12. The system of claim 1, wherein the operations comprise, responsive to receiving approval of one or more learning concepts, associating, in an item bank as a new item bank record, at least a first learning concept of the one or more learning concepts, the at least one learning objective, the set of learning object parameters, and the grounding knowledge.

13. A method for guided generation of new content items for an online learning platform, the method comprising:
  generating, by processing circuitry for presentation to a user of a remote computing device, a first user interface comprising a plurality of first interactive controls configured to obtain, via first user interactions, selection of a set of learning objective parameters associated with a new content item and grounding knowledge related to a learning subject or a learning topic;
  combining, by the processing circuitry, the set of learning objective parameters with a learning objectives prompt template to create a learning objectives AI model prompt;
  obtaining, responsive to prompting a first AI model using the learning objectives AI model prompt and the grounding knowledge, a plurality of learning objectives;
  presenting, to the user of the remote computing device, a second user interface comprising a at least one second interactive control for enabling approval of at least one learning objective of the plurality of learning objectives;
  combining, by the processing circuitry, the set of learning objective parameters and the at least one learning objective with a learning concepts prompt template to create a learning concepts AI model prompt;
  obtaining, responsive to prompting a second AI model using the learning concepts AI model prompt and the grounding knowledge, one or more learning concepts;
  generating, by the processing circuitry for presentation to the user of the remote computing device, a third user interface comprising at least one third interactive control configured to obtain, via third user interactions, approval of one or more learning concepts of the at least one learning concept;

after receiving the approval of the one or more learning concepts, generating, by the processing circuitry for presentation to the user of the remote computing device, a fourth user interface comprising at least one fourth interactive control configured to obtain, via fourth user interactions, at least one content item parameter associated with the new content item;

combining, by the processing circuitry, the at least one content item parameter, the set of learning objectives parameters, the at least one learning objective, and at least one learning concept of the one or more learning concepts with a content item prompt template to create a content item AI model prompt;

obtaining, responsive to prompting a third AI model using the content item AI model prompt and the grounding knowledge, at least one content item generated by the third AI model; and generating, by the processing circuitry for presentation to the user of the remote computing device, a fifth user interface comprising at least one fifth interactive control configured to obtain, via at least one fifth user interaction, approval of the at least one content item.

14. The method of claim 13, wherein one or more controls of the plurality of first interactive controls configured to obtain the grounding knowledge is configured to obtain, via a portion of the first user interactions, selection of a subject or a topic.

15. The method of claim 13, wherein the set of learning objective parameters comprises at least one of a grade level, a grade range, an age level, an age range, or one or more learning standard frameworks.

16. The method of claim 13, further comprising:
generating, by the processing circuitry for presentation to the user of the remote computing device, a sixth user interface comprising at least one interactive control configured to obtain, via sixth user interactions, at least one learning concept parameter associated with the new content item;

wherein the at least one learning concept parameter is further combined with the learning concepts prompt template to create the learning concepts AI model prompt.

17. The method of claim 16, wherein the at least one learning concept parameter comprises a selected subject of a plurality of subjects.

18. The method of claim 13, wherein the at least one content item parameter comprises a selected assessment item type of a plurality of assessment item types.

19. The method of claim 13, wherein the first AI model, the second AI model, and the third AI model are all different AI models.

* * * * *

UNITED STATES PATENT AND TRADEMARK OFFICE
CERTIFICATE OF CORRECTION

| | |
|---|---|
| PATENT NO. | : 12,475,807 B1 |
| APPLICATION NO. | : 18/757875 |
| DATED | : November 18, 2025 |
| INVENTOR(S) | : Alexandrea Kavita Ramnarine et al. |

Page 1 of 1

It is certified that error appears in the above-identified patent and that said Letters Patent is hereby corrected as shown below:

In the Claims

Column 41, Line 27-28, Claim 1, "presenting, at a graphical user interface rendered at to the end user at the user computing device," should read --presenting, to the end user at the user computing device,--.

Signed and Sealed this
Twenty-seventh Day of January, 2026

John A. Squires
*Director of the United States Patent and Trademark Office*